(12) United States Patent
Gong et al.

(10) Patent No.: US 12,296,341 B2
(45) Date of Patent: May 13, 2025

(54) APPARATUS AND METHOD FOR FORMING DROPLETS HAVING PREDETERMINED VOLUME BY ELECTROWETTING

(71) Applicant: MGI Tech Co., Ltd., Shenzhen (CN)

(72) Inventors: Jian Gong, Danville, CA (US); Shifeng Li, Fremont, CA (US); Cheng Frank Zhong, Menlo Park, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 940 days.

(21) Appl. No.: 17/263,765

(22) PCT Filed: Aug. 1, 2019

(86) PCT No.: PCT/IB2019/056588
§ 371 (c)(1),
(2) Date: Jan. 27, 2021

(87) PCT Pub. No.: WO2020/026200
PCT Pub. Date: Feb. 6, 2020

(65) Prior Publication Data
US 2021/0178397 A1      Jun. 17, 2021

Related U.S. Application Data

(60) Provisional application No. 62/713,724, filed on Aug. 2, 2018.

(51) Int. Cl.
*B01L 3/00*         (2006.01)
*G01N 27/414*       (2006.01)

(52) U.S. Cl.
CPC ...... *B01L 3/502792* (2013.01); *G01N 27/414* (2013.01); *B01L 2300/0663* (2013.01); *B01L 2300/165* (2013.01); *B01L 2400/0427* (2013.01)

(58) Field of Classification Search
CPC ............. G01N 27/414; B01L 3/502792; B01L 2300/0663; B01L 2300/161; B01L 2300/165; B01L 2400/0427
See application file for complete search history.

(56) References Cited

U.S. PATENT DOCUMENTS

| | | | |
|---|---|---|---|
| 2003/0164295 A1* | 9/2003 | Sterling | B01L 3/50273 204/600 |
| 2010/0307922 A1* | 12/2010 | Wu | B01F 33/3031 204/643 |

(Continued)

FOREIGN PATENT DOCUMENTS

| | | |
|---|---|---|
| CN | 101687191 A | 3/2010 |
| CN | 103733059 B | 4/2014 |

(Continued)

OTHER PUBLICATIONS

Application No. PCT/IB2019/056588, International Search Report and Written Opinion, Mailed on Dec. 27, 2019, 8 pages.

(Continued)

*Primary Examiner* — C. Sun
(74) *Attorney, Agent, or Firm* — Kilpatrick Townsend & Stockton LLP

(57) ABSTRACT

An apparatus for forming a plurality of microdroplets (26a, 26', 56) from a droplet (16, 26, 263) includes a substrate (12, 22, 22b, 22c, 1101), a dielectric layer (13, 23, 23b, 23c, 43a, 43b, 43) on the substrate (12, 22, 22b, 22c, 1101) and having a plurality of hydrophilic surface regions (48a, 491, 49) spaced apart from each other by a hydrophobic surface (44, 46), and a plurality of electrodes (14, 14a, 14b, 24, 24a, 24b, 24c, 34a, 34b, 34c) in the dielectric layer (13, 23, 23b, 23c, 43a, 43b, 43). The electrodes (14, 14a, 14b, 24, 24a, 24b, 24c, 34a, 34b, 34c) are configured to form an electric field (E) across the droplet (16, 26, 263) in response to voltages provided by a control circuit (15, 28, 67) to move the droplet (Continued)

(16, 26, 263) across the dielectric layer (13, 23, 23*b*, 23*c*, 43*a*, 43*b*, 43) in lateral direction (F) while leaving portions of the droplet (16, 26, 263) on the hydrophilic surface regions (48*a*, 491, 49) to form the plurality of microdroplets (26*a*, 26', 56) on the hydrophilic surface regions (48*a*, 491, 49).

13 Claims, 18 Drawing Sheets

(56) References Cited

U.S. PATENT DOCUMENTS

| | | | |
|---|---|---|---|
| 2012/0106238 A1* | 5/2012 | John | B01L 3/50273 365/189.16 |
| 2013/0116128 A1* | 5/2013 | Shen | C12Q 1/6874 506/2 |
| 2013/0143312 A1* | 6/2013 | Wheeler | G01N 33/54386 435/287.1 |
| 2014/0287423 A1 | 9/2014 | Nurse | |
| 2014/0299472 A1 | 10/2014 | Chang et al. | |
| 2016/0199832 A1* | 7/2016 | Jamshidi | B01F 33/3031 204/600 |
| 2017/0138901 A1 | 5/2017 | Norton | |
| 2019/0181273 A1* | 6/2019 | van Rooyen | H01L 29/42384 |

FOREIGN PATENT DOCUMENTS

| | | |
|---|---|---|
| CN | 104846100 B | 8/2015 |
| CN | 105916689 A | 8/2016 |
| TW | 201632261 A | 9/2016 |
| TW | 201726540 A | 8/2017 |
| WO | 2009100516 A1 | 8/2009 |

OTHER PUBLICATIONS

Application No. CN201980051553.0 , Office Action, Mailed on Mar. 31, 2022, Machine Translation begins on p. 11, 19 pages.

* cited by examiner

APPARATUS AND METHOD FOR FORMING DROPLETS HAVING PREDETERMINED VOLUME BY ELECTROWETTING

CROSS-REFERENCES TO RELATED APPLICATIONS

This application is a national phase application of PCT Application No. PCT/IB2019/056588, filed Aug. 1, 2019, which claims benefit of U.S. Provisional Patent Application No. 62/713,724, filed Aug. 2, 2018, which applications are incorporated herein by reference in their entirety.

FIELD OF THE INVENTION

Embodiments of the present invention relate generally to electrowetting-on-dielectric (EWOD) technology, and more particularly relate to apparatuses and methods for forming microdroplets having a predetermined volume from one or more bulk droplets by electrowetting techniques.

BACKGROUND OF THE INVENTION

Electrowetting-on-dielectric (EWOD) is a liquid driving mechanism to change a contact angle of an aqueous droplet between two electrodes on a hydrophobic surface. A bulk liquid droplet as large as several millimeters (i.e., several microliters in volume) can be moved by an array of electrodes disposed on a substrate, such as an inorganic substrate (e.g., silicon/glass substrate) or organic substrate (e.g., a cyclic olefin polymer/polycarbonate substrate).

FIG. 1A is a perspective view of a schematic diagram illustrating an EWOD device 10 that may be used to explain embodiments of the present disclosure. The EWOD device includes a substrate structure 11 having a substrate 12, an insulating layer 13 on the substrate, and an array of electrodes 14 within or under the insulating layer. The array of electrodes 14 includes a first set of electrodes 14a arranged in parallel to each other and spaced apart from each other in a first direction, and a second set of electrodes arranged in parallel to each other and spaced apart from each in a second direction substantially perpendicular to the first direction. The first and second set of electrodes are spaced apart from each other within the insulating layer 13, which may include a plurality of dielectric layers of the same material or different materials. The EWOD device also includes an input-output circuit 15 in the substrate and operative to interface with an external control circuit to provide control voltages having time-varying voltage waveforms to the array of electrodes 14.

Referring to FIG. 1A, a liquid droplet 16 disposed on the surface of the insulating layer 13 may be moved along a certain direction by turning off/off control voltages at electrodes below the droplet and at adjacent electrodes.

FIG. 1B is a cross-sectional view of the EWOD device shown in FIG. 1A taken along the line B-B'. The cross sectional view of the second set of electrodes 14b is shown. The first set of electrodes 14a (not shown) may be disposed above or below the second set of electrodes 14b and spaced apart from the second set of electrodes by one or more dielectric layers.

BRIEF SUMMARY OF THE INVENTION

Embodiments of the present disclosure provides an apparatus, system, and method for mixing a droplet with reagents, forming extremely small drops (particles, microdroplets, or samples) from the mixed droplet, reading the DNA concentration of the samples by optical detection or measuring the pH value of each sample through integrated ion-sensitive field-effect transistor (ISFET) sensors, thereby calculating the DNA concentration of the droplet. It should be noted that although the embodiments describe apparatuses and processes of measuring a pH value of a droplet, the present disclosure is not limited thereto. Those of skill in the art will appreciate that the apparatuses and processes described herein may be applied to pH measurements of any aqueous and non-aqueous liquids based on pH changes within the extremely small drops (microdroplets.

In one aspect embodiment of the present disclosure, an apparatus for forming a plurality of microdroplets from a droplet includes a substrate, a dielectric layer on the substrate and having a plurality of hydrophilic surface regions spaced apart from each other by a hydrophobic surface, and a plurality of electrodes in the dielectric layer. The electrodes are configured to form an electric field across the droplet in response to voltages provided by a control circuit to move the droplet across the dielectric layer in a lateral direction while leaving portions of the droplet on the hydrophilic surface regions to form the plurality of microdroplets on the hydrophilic surface regions. In some embodiments, the apparatus may further include one or more sensors associated with one of the hydrophilic surface regions. A sensor includes an ion sensitive field effect transistor containing an ion sensing film configured to be exposed to a solution containing in a microdroplet and provide a signal associated with a concentration level of the solution of the microdroplet, and a reference electrode configured to apply a reference voltage to the solution.

In another aspect, a substrate structure includes a first substrate, a dielectric layer having a hydrophobic surface on the first substrate, a control circuit, a plurality of conductive wirings, and a plurality of electrodes in communication with the control circuit through the conductive wirings and configured to form electric fields in response to voltages provided by the control circuit. The dielectric layer includes a first region for receiving a droplet, a second region for receiving one or more reagents, the second region being in communication with the first region and configured to mix the droplet with the one or more reagents to obtain a mixed droplet, and a third region in communication with the second region and comprising a plurality of hydrophilic surface regions spaced apart from each other by the hydrophobic surface. A portion of the droplet forms a plurality of microdroplets on the hydrophilic surface regions when the droplet moves over the hydrophilic surface regions.

In some embodiments, the apparatus also includes a fourth region in communication with the third region and configured to collect a remaining portion of the droplet after the remaining portion of the droplet has moved across the third region.

In some embodiments, the substrate structure further includes a second substrate and an electrically conductive layer on the second substrate facing the hydrophobic surface of the dielectric layer, and a space between the electrically conductive layer and the dielectric layer forming a channel for the droplet.

In some embodiments, the electrically conductive layer is operative as a common electrode, and the plurality of electrodes comprise a first array of parallel stripes along a first direction from the first region to the third region, and a second array of parallel stripes in the second region along a second direction perpendicular to the first direction.

In some embodiments, the third region further includes one or more sensors associated with one of the plurality of hydrophilic surface regions. A sensor includes an ion sensitive field effect transistor including an ion sensing film configured to be exposed to a solution containing in a microdroplet and provide a signal associated with a concentration level of the solution of the microdroplet, and a reference voltage electrode configured to apply a reference voltage to the solution.

In yet another aspect, a method for forming a plurality of samples having a substantially uniform size from a droplet may include providing a substrate structure having a substrate, a dielectric layer on the substrate, a plurality of electrodes in the dielectric layer, wherein the dielectric layer has a hydrophobic surface and a plurality of hydrophilic surface regions surrounded by the hydrophobic surface, discharging the droplet on a surface of the dielectric layer, and applying time-varying voltage waveforms to the electrodes to move the droplet across the hydrophilic surface regions of the dielectric layer to form the plurality of samples on the hydrophilic surface regions.

This summary is provided to introduce the different embodiments of the present disclosure in a simplified form that are further described in detail below. This summary is not intended to be used to limit the scope of the claimed subject matter. Other features, details, utilities, and advantages of the claimed subject matter will be apparent from the following detailed description.

DEFINITIONS

The terms "wafer" and "substrate" are to be understood as including silicon-on-insulator (SOI) or silicon-on-sapphire (SOS) technology, doped and undoped semiconductors, epitaxial layers of silicon supported by a base semiconductor foundation, and other semiconductor structures. Furthermore, when reference is made to a "wafer" or "substrate" in the following description, previous process may have been utilized to form regions or junctions in the base semiconductor structure or foundation. In addition, the semiconductor need not be silicon-based, but could be based on silicon-germanium, germanium, or gallium arsenide.

The term "computer readable medium" as used herein refers to any medium that participates in providing instructions to the processor of the controller for execution. A computer readable medium may take many forms, including but not limited to, nonvolatile media, volatile media, and transmission media. Nonvolatile media includes, for example, optical disks, magnetic disks, and magneto-optical disks, such as the hard disk or the removable media drive. Volatile media includes dynamic memory, such as the main memory. Moreover, various forms of computer readable may be involved in carrying out one or more sequences of one or more instructions to the processor of the controller for execution. For example, the instructions may initially be carried on a magnetic disk of a remote computer. The remote computer can load the instructions for implementing all or a portion of the present invention remotely into a dynamic memory and send the instructions over a network to the controller.

The term "hydrophobic" refers to a material having a contact angle of water in air of greater than or equal to 90 degrees. In certain embodiments, hydrophobic surfaces may feature contact angle greater than 90 degrees, such 120 degrees, 150 degrees, etc. In contrast, the term "hydrophilic" refers to a material having a contact angle of water in air or immiscible liquid such as oil of less than 90 degrees.

The term "droplet" has its normal meaning in the art and refers to a liquid with boundaries formed at least in part by surface tension having a certain volume, e.g., between about several milliliters ($10^{-3}$) to about several microliters ($10^{-6}$). A droplet may be a water-based (aqueous) droplet including any organic or inorganic species such as, biological molecules, proteins, living or dead organisms, reagents, and any combination thereof. A droplet may be a non-aqueous liquid. A droplet may be spherical or non-spherical and have a size ranging from 1 micron to of about several millimeters. A droplet may be partitioned into multiple very small portions (small droplets) that are spaced apart from each other and having a substantially uniform size. The very small portions may have a volume of between 1 microliter ($10^{-6}$ L or mL) and 100 nanoliter ($10^{-9}$ liter or nL), between 100 nL and 10 10 nL, between 10 nL and 100 pL ($10^{-12}$ liter), 100 pL and 10 pL. In certain embodiments, the very small portions may have a volume of a few picoliters. The very small portions are alternatively referred to as microdoplets in the present disclosure.

The term "reagent" refers to a molecule or a compound of different molecules being able to induce a specific reaction with a species present in a droplet.

BRIEF DESCRIPTION OF THE DRAWINGS

FIG. 3A is a simplified top view illustrating that a droplet is discharged on a first electrode of an array of electrodes according to an embodiment of the present disclosure. FIG. 3B is a simplified top view illustrating that the droplet is moved to a second (adjacent) electrode under the effect of electric fields by the EWOD device according to an embodiment of the present disclosure.

FIG. 3C is a simplified top view illustrating that the droplet is moved out of the array of electrodes while leaving a residue on the second electrode according to an embodiment of the present disclosure.

Figure 1A:
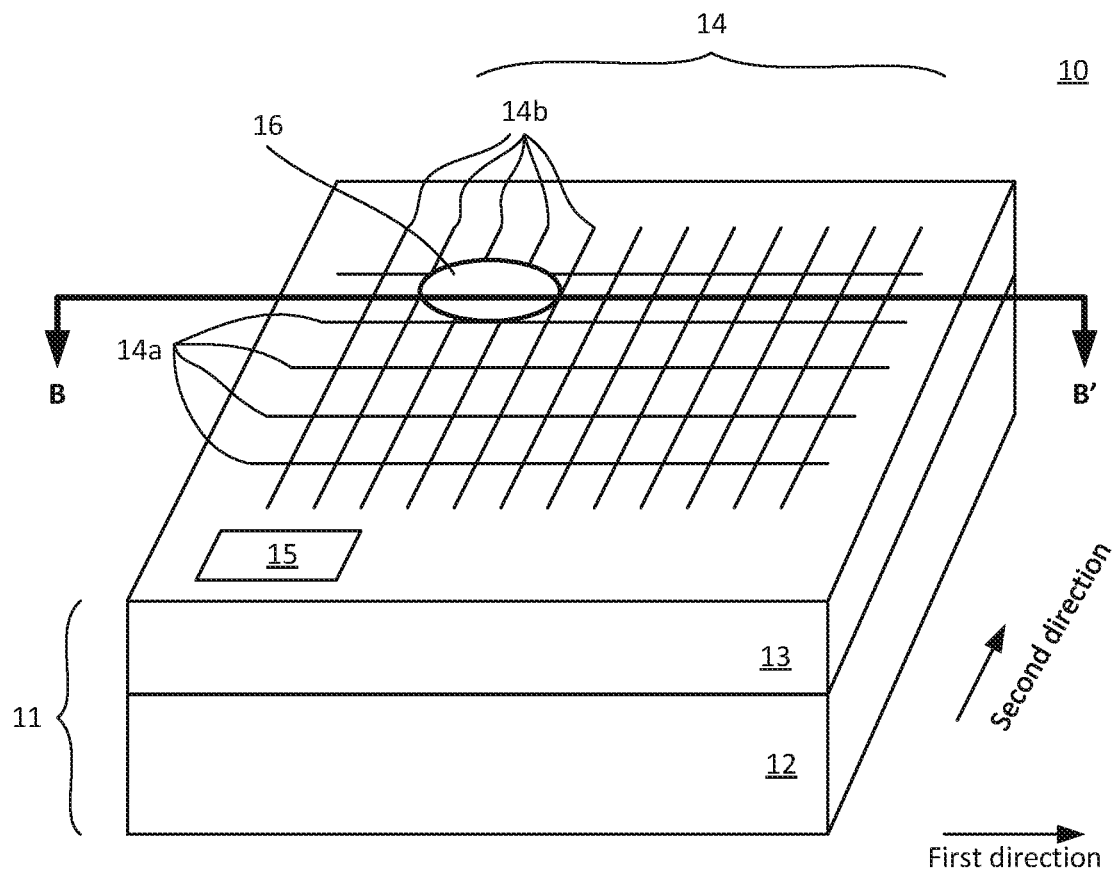
FIG. 1A is a simplified perspective view of a schematic diagram illustrating an EWOD device that may be used to explain embodiments of the present disclosure.

In accordance with common practice, the described features and elements are not drawn to scale but are drawn to emphasize features and elements relevant to the present disclosure.

DETAILED DESCRIPTION

It will be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

In the following detailed description, reference is made to the accompanying drawings which form a part hereof, and in which is shown by way of illustration specific embodiments in which the invention may be implemented. The term "upper", "lower", "vertical", "horizontal", "depth", "height", "width", "top", "bottom", etc., is used with reference to the orientation of the Figures being described. Because components of embodiments of the present invention can be positioned in a number of different orientations, the term is used for purposes of illustration and is not limiting.

The use of the terms first, second, etc. do not denote any order, but rather the terms first, second, etc. are used to distinguish one element from another. Furthermore, the use of the terms a, an, etc. does not denote a limitation of quantity, but rather denote the presence of at least one of the referenced items.

As used herein, turning off an electrode refers to lowering the voltage of that electrode to a level below a common voltage, such as connecting an electrode to a ground potential. Alternatively, turning off an electrode may also refer to setting that electrode in a floating state. Conversely, turning on an actuation electrode refers to increasing the voltage of that actuation electrode to a level above the common voltage. The common voltage may be any voltage that is shared by a number of circuit elements of the EWOD device, e.g., the ground potential.

As used herein, a droplet is an encapsulated liquid. A droplet may be spherical or non-spherical. A droplet may be partitioned into multiple very small portions (microdroplets) that are spaced apart from each other and having a substantially uniform size. The very small portions of the droplet are alternatively referred to as microdroplets in the present disclosure.

Figure 2A:
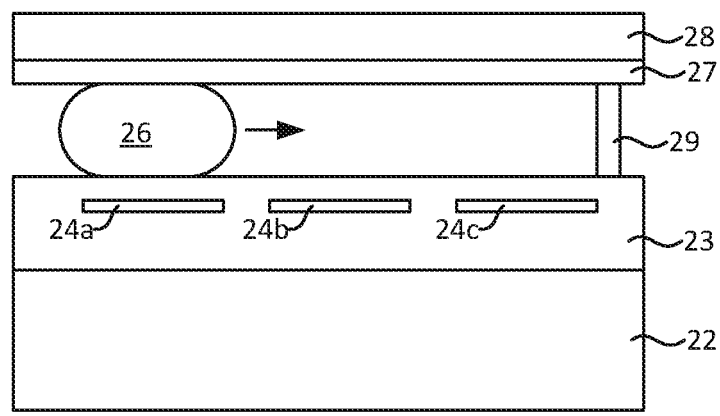
FIG. 2A is a simplified cross-sectional view of a portion of an EWOD device according to an embodiment of the present disclosure.

FIG. 2A is a simplified cross-sectional view of a portion of an EWOD device 20A according to an embodiment of the present disclosure. Referring to FIG. 2A, the EWOD device 20A includes a first substrate 22, a dielectric layer 23 on the substrate 21, a set of actuation electrodes 24 (e.g., 24a, 24b, 24c) within the dielectric layer 23, a common electrode 27 attached to a second substrate 28 and facing toward the actuation electrodes 24. The common electrode 27 may be grounded or have other common voltage. The dielectric layer 23 and the common electrode 27 are spaced apart from each other by a spacer 29. Referring to FIG. 2A, a liquid droplet 26 is disposed between the actuation electrodes 24 and the common electrode 27 and is moving along a lateral direction across the surface of the dielectric layer 23 by means of changing or varying the voltage levels applied to the actuator electrodes in relation to the common electrode. In an embodiment, the EWOD device 20A may further include a control circuit (not shown) configured to provide control voltages to the common electrode and the actuation electrodes. By turning on and off voltages applied to the actuation electrodes, the control circuit can move the liquid droplet 26 in a lateral direction across the surface of the dielectric layer 23. For example, an electric field is generated by applying a first voltage to the actuation electrode 24a below the droplet 26 and a second voltage to the adjacent actuation electrode 24b, the generated electric field causes the droplet 26 to move toward the actuation electrode 24b. The moving speed of the droplet 26 can be controlled by the magnitude of a voltage difference between the adjacent actuation electrodes. In one embodiment, the form of the liquid droplet 26 can be changed by varying the voltage difference between the actuation electrodes 24 and the common electrode 27 where the droplet 26 is disposed therebetween. It is understood that the number of actuation electrodes in the set of actuation electrodes can be any integer number. In the example shown in FIG. 2A, three actuation electrodes are used in the set of actuation electrodes. But it is understood that the number is arbitrary chosen for describing the example embodiment and should not be limiting.

Referring to FIG. 2A, two substrate structures may be separately formed. For example, a first substrate structure may be formed including the substrate 22, the dielectric layer 23, and the actuation electrodes 24 within the dielectric layer 23. The substrate 22 may be a thin-film transistor (TFT) array substrate formed by conventional thin-film transistor manufacturing processes. A second substrate structure may include a substrate 28 and a common electrode layer 27 on the substrate 28. A spacer 29 may be formed either on the first substrate structure or the second substrate structure. In certain embodiments, the spacer 29 has a height in the range between several micrometers to several millimeters. In general, the height of the spacer 29 is less than the diameter of the droplet such that the droplet disposed on the dielectric layer 23 has physical contact with the second substrate structure. The first and second substrate structures are then bonded together to form the EWOD device 20A. In other words, the space or air gap between the first substrate structure and the second substrate structure is determined by the height or thickness of the spacer 29. The space or air gap forms a channel for the droplet.

In the embodiment shown in FIG. 2A, the common electrode 27 and the set of actuation electrodes 24 (e.g., 24a, 24b, 24c) are connected to voltages provided by a control circuit (not shown) through the input-output circuit 15 shown in FIG. 1A. In some embodiments, the common electrode may be connected to a ground potential or a stable DC voltage. The control circuit applies time varying voltages through the input-output circuit to the set of actuation electrodes through respective electronic switches (that can be, e.g., thin film transistors or MOS circuitry in the substrate or off-chip) to generate an electric field across the droplet to move the droplet along a path. In some embodiments, the surface of the common electrode 27 is covered by an insulating layer made from a hydrophobic material. In other embodiments, the surface of the dielectric layer 23 is coated with a thin hydrophobic film having a submicron thickness.

Figure 2B:
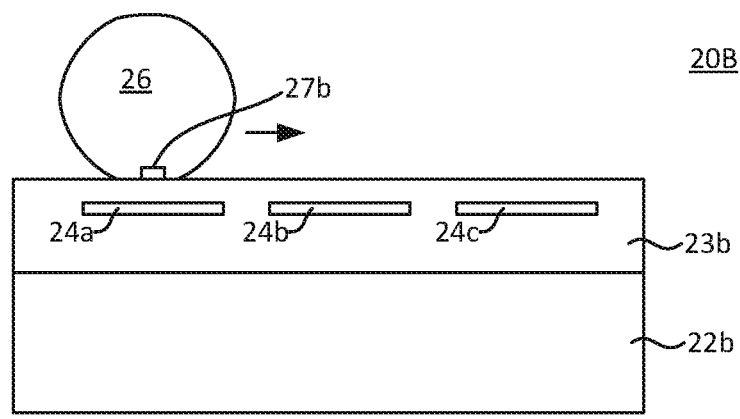
FIG. 2B is a simplified cross-sectional view of a portion of an EWOD device according to another embodiment of the present disclosure.

FIG. 2B is a simplified cross-sectional view of a portion of an EWOD device 20B according to another embodiment of the present disclosure. Referring to FIG. 2B, the EWOD device 20B includes a substrate 22b, a dielectric layer 23b on the substrate 21b, a set of actuation electrodes 24 (24a, 24b, 24c) within the dielectric layer 23b, and a set of common electrodes 27 (only one electrode 27b is shown) overlying the dielectric layer 23b. The common electrode 27b and the actuation electrodes are spaced apart from each other by a portion of the dielectric layer. Similar to FIG. 2A, the droplet 26 can be moved along a path in the lateral direction across the surface of the dielectric layer 23b by applying a first voltage at the actuation electrode (e.g., 24a) below the droplet 26 and a second voltage at the adjacent actuation electrode (e.g., 24b). The movement and direction of the droplet 26 is thus controlled by the control circuit (not shown) which applies voltages to certain actuation electrodes through a set of electronic switches (MOS circuitry in the substrate 22b, not shown). Different to the EWOD 20A shown in FIG. 20A, the EWOD device 20B has the common electrode 27b close to the actuation electrodes 24, and the droplet 26 is not sandwiched between the common electrode 27 and the actuation electrodes 24. The EWOD device 20B also differs from the EWOD 20A by not having the spacer 29.

Referring to FIG. 2B, the set of actuation electrodes 24 and the set of common electrodes 27 may be two layers of strip electrodes intersected with each other on different planes on the substrate. The actuator electrodes 24 and the common electrodes 27 are operative to move the droplet 26 across the surface of the dielectric layer 23b. In some embodiments, the common electrode 27b has a surface that is covered by an insulating layer made from a hydrophobic material. In other embodiments, the surface of the dielectric layer 23 is coated with a thin hydrophobic film having a submicron thickness.

Figure 2C:
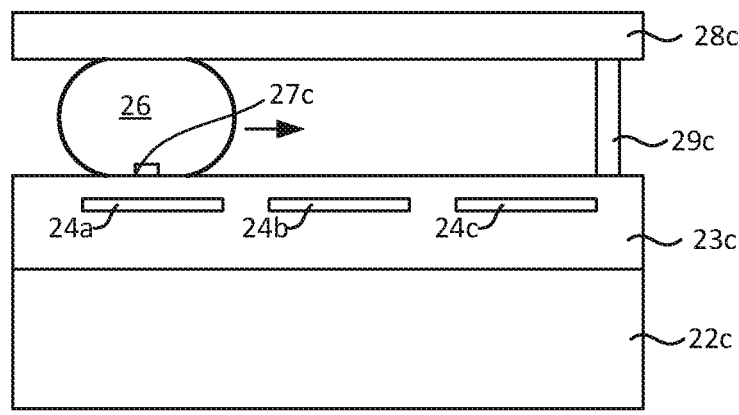
FIG. 2C is a simplified cross-sectional view of a portion of an EWOD device according to yet another embodiment of the present disclosure.

FIG. 2C is a cross-sectional view of a portion of an EWOD device 20C according to yet another embodiment of the present disclosure. Referring to FIG. 2C, the EWOD device 20C includes a substrate 22c, a dielectric layer 23c on the substrate 22c, a set of actuation electrodes 24 (e.g., 24a, 24b, 24c) within the dielectric layer 23c, a set of common electrode (e.g., one common electrode 27c is shown) overlying the dielectric layer 23c. The common electrode 27c and the actuation electrodes are spaced apart from each other by a portion of the dielectric layer. In some embodiments, the common electrode 27c has a surface that is covered by an insulating layer made from a hydrophobic material or a thin film of submicron hydrophobic coating on the surface of dielectric layer 23. The EWOD device 20C may further include a second substrate 28c spaced apart from the substrate 21c through a spacer 29c. Similar to FIG. 2A, the droplet 26 can be moved along a path within the channel formed by a space or air gap between the surface of the dielectric layer and the second substrate 28c. The movement of the droplet is controlled by voltages applied to the electrodes through electronic switches by a control circuit (not shown).

Figure 2D:
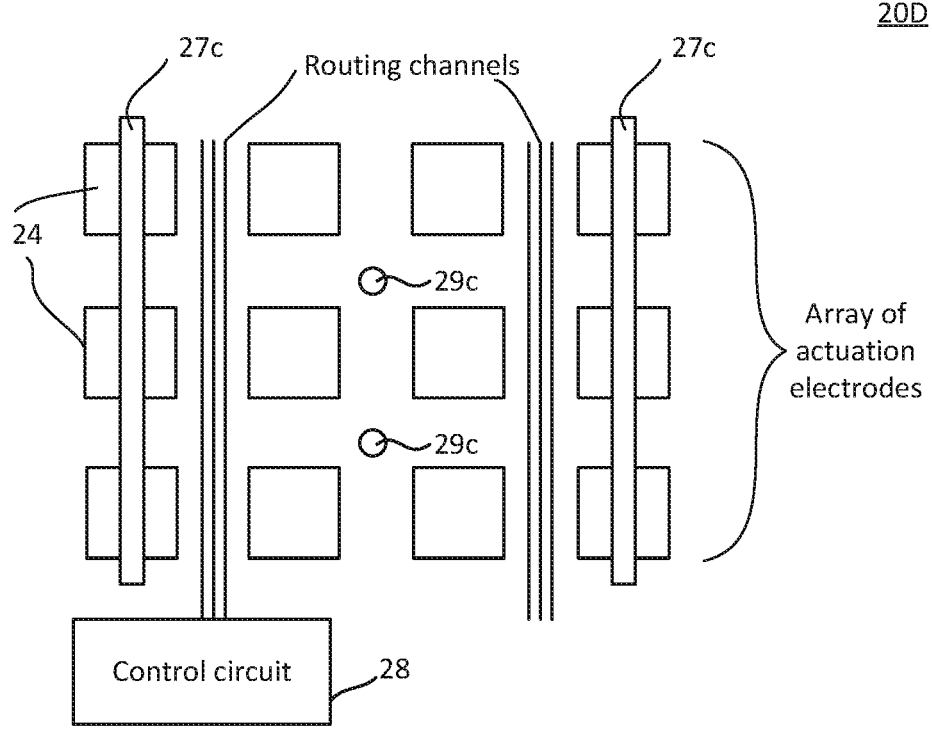
FIG. 2D is a simplified plan view of an EWOD device according to an exemplary embodiment of the present disclosure.

FIG. 2D is a simplified plan view of an EWOD 20D according to an exemplary embodiment of the present disclosure. Referring to FIG. 2D, the actuation electrodes are arranged in an array having routing channels for routing electrical signals from a control circuit 28 to the actuation electrodes 24 and to the common electrodes 27c. The spacer 29c is shown to have a circular cross-section, however, the circular cross-sectional shape is not limiting and any other cross-sectional shapes are equally suitable such as square, rectangular, oval, elliptic and other shapes. Similarly, the actuation electrodes are shown to have a square shape, but the square shape is not limiting and other shapes are equally suitable such as rectangular, circular, oval, elliptic and other shapes. In one embodiment, the spacer 29c is spaced at a distance to leave sufficient space to allow free movement of the droplet. In order words, the spacer 29c is dimensioned and spaced such a way that it does not hinder movements of the droplet across the surface of the dielectric layer. It will be understood that although the routing channels are shown as coplanar with the array of electrodes, one of skill in the art will appreciate that the routing channels and the control circuit can be disposed in the substrate and in different layers of the dielectric layer. It will also be understood that the actuation electrodes 24 and the common electrodes 27c can have their relative positions transposed, i.e., the common electrodes may be disposed below the actuation electrodes.

In another embodiment, the EWOD device may have a single array of electrodes. In other words, the common electrodes and the actuation electrodes are coplanar, i.e., the common electrodes and the actuation electrodes are arranged in a same plane within the dielectric layer. For example, a plurality of actuation electrodes and a plurality of common electrodes are arranged alternatively adjacent to each other, the control circuit may apply DC or AC voltages and ground potential sequentially to the actuation electrodes and common electrodes to control the movement of the droplet. In yet another embodiment, each electrode in the array of electrodes is individually controlled by a control circuit through a set of electronic switches such that each electrode can be an actuator electrode at a first time period and a common electrode at a second time period.

Figure 2E:
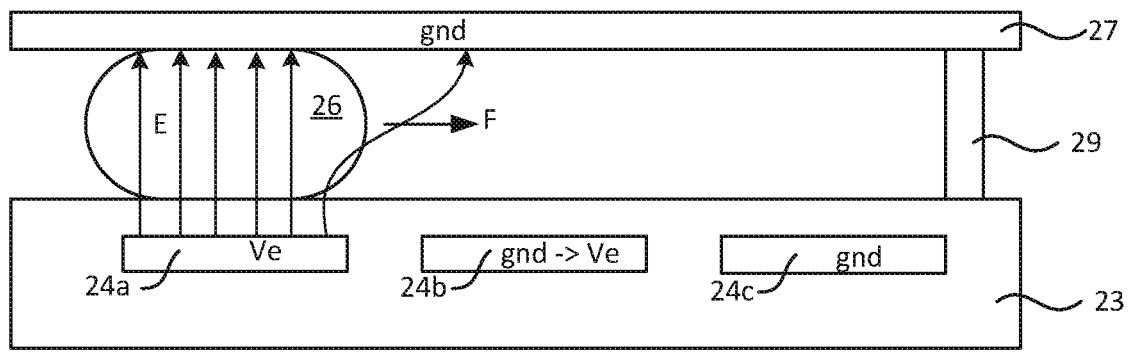
FIG. 2E is a simplified cross-sectional view illustrating electric fields generated by electrodes according to an embodiment of the present disclosure.

FIG. 2E is a simplified cross-sectional view illustrating exemplary electric fields 20E generated by electrodes according to an embodiment of the present disclosure. Referring to FIG. 2E, a common electrode 27 may be driven by a ground potential (gnd), and actuation electrodes 24a, 24b, 24c may be driven by a DC or AC voltage (Ve) in a time-sequential manner. For example, an DC voltage is first applied to the electrode 24a, the voltage difference between the actuation electrode 24a and the common electrode 27 generates an electric field E that moves the droplet 26 along the microchannel defined by the electrode 27 and the dielectric layer 23. By setting a voltage at an electrode adjacent to the droplet 26, the droplet 26 can be moved to that electrode along the lateral direction between the dielectric layer 23 and the common electrode 27. This structure is similar or the same as the EWOD device shown in FIG. 2A. In one embodiment, the DC voltages may be provided by a control circuit through the input-output circuit 15 shown in FIG. 1A). The main electric field is perpendicular to the surface of the dielectric layer 23.

Figure 2F:
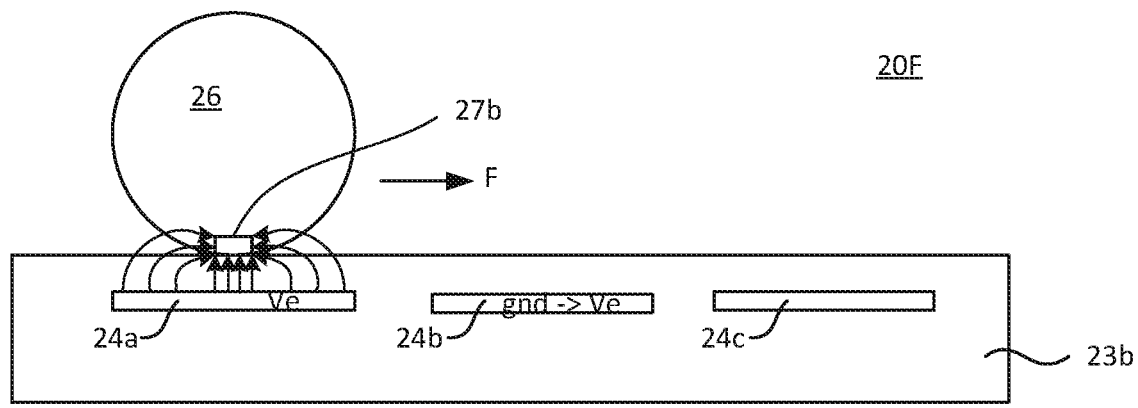
FIG. 2F is a simplified cross-sectional view illustrating electric fields generated by electrodes according to another embodiment of the present disclosure.

FIG. 2F is a simplified cross-sectional view illustrating exemplary electric fields 20F generated by electrodes according to another embodiment of the present disclosure. Referring to FIG. 2F, a control circuit (not shown) may apply DC or AC voltages to the electrodes 24a, 24b, 24c, and 27b in a time-sequential manner to generate electric field patterns that control the movement of the droplet 26. For example, a voltage set at an electrode adjacent to the droplet will move the droplet onto that electrode. This structure is the same or similar to the EWOD device shown in FIG. 2B or 2C.

Figure 2G:
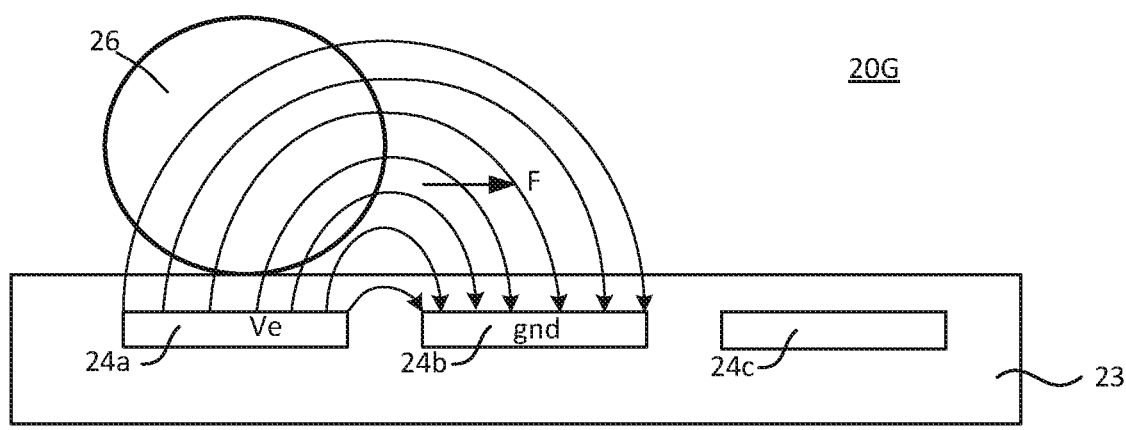
FIG. 2G is a simplified cross-sectional view illustrating electric fields generated by electrodes according to yet another embodiment of the present disclosure.

FIG. 2G is a simplified cross-sectional view illustrating electric fields 20G generated by electrodes according to another embodiment of the present disclosure. Referring to FIG. 2F, a control circuit (not shown) may apply DC or AC voltages to the electrodes 24a, 24b, and 24c in a time-sequential manner to generate electric field patterns that control the movement of the droplet 26. In this embodiment, the electrodes 24a, 24b, and 24c may be operative alternatively as actuator electrodes and common electrodes. The half-cylindrical field is formed between the electrodes 24a and 24B. Referring to FIGS. 2E, 2F, and 2G, the electric filed E and the resulting electric force F are a function of the voltage difference between the electrodes and the size of the electrodes. By varying the voltage difference between adjacent electrodes in a time-sequential manner, an electric field and the resulting force are generated causing the transport of the droplet 26 along the direction of the electric force. In some embodiments, the not active electrodes (e.g., electrode 24c), which do not contribute to the movement (or transport) of the droplet, can be left floating, i.e., not connected. In the example shown in FIG. 2G, the droplet 26 will stay between the electrodes 24a and 24b, i.e., between the voltage Ve and ground.

Figure 3A:
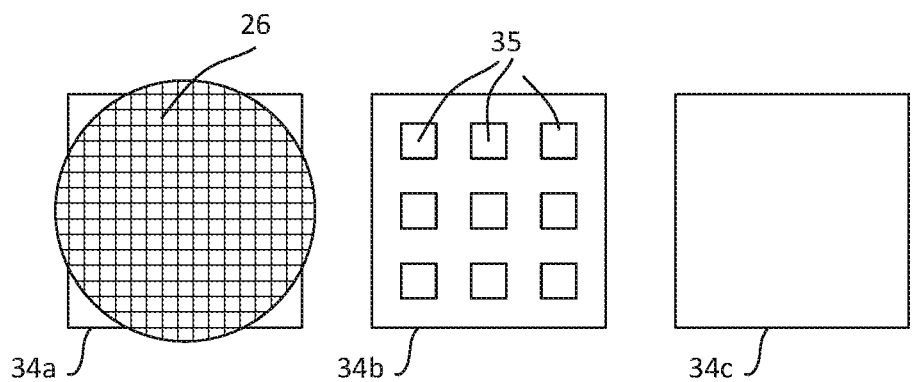
FIGS. 3A to 3C are simplified top views of a droplet moving across a surface of a dielectric layer according to embodiments of the present disclosure.
Figure 3B:
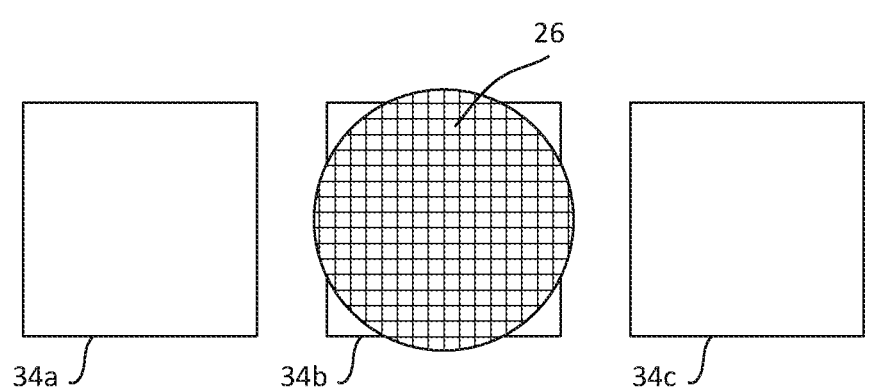
Figure 3C:
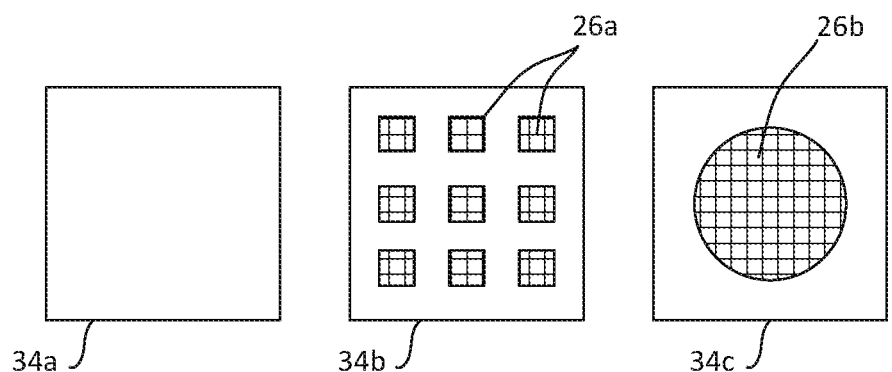

FIGS. 3A to 3C are top sequential views of a droplet moving across a surface of a dielectric layer according to an embodiment of the present disclosure. Referring to FIG. 3A, a droplet 26 is disposed on an EWOD device as described above in any of the EWOD devices 20A, 20B, and 20C. The EWOD device includes a substrate having an array of thin-film transistors or MOS circuitry, a dielectric layer on the substrate, and an array of actuation electrodes (and/or common electrodes) within the dielectric layer, the actuations electrodes and the common electrodes are connected to a control circuit through conductive wirings in the routing channels and receive control signals from the control circuit via the thin-film transistors. The droplet 26 is disposed on a surface of the dielectric layer above a first actuator electrode 34a. By turning off (or floating) the first actuation electrode below the droplet and turning on the actuation electrode next to it, the droplet can be moved toward the next electrode. In one embodiment, the surface portion of the dielectric layer above the array of the actuation electrodes can be modified with a predefined feature which has more attraction to a liquid (e.g., the liquid droplet) than a hydrophobic surface. The feature may have a dimension ranging from micrometer to nanometer corresponding to microliter and nanoliter in volume, respectively. The feature 35 may be manufactured on the dielectric layer accurately thousands or million times on the dielectric layer using currently available submicron semiconductor manufacturing processes.

As used herein, turning off an actuation electrode refers to lowering the voltage of that actuation electrode to a level same as a common voltage which is applied to the common electrode. Conversely, turning on an actuation electrode refers to increasing the voltage of that actuation electrode to a level above the common voltage. The EWOD devices can operate with DC (DC electrowetting) or AC (AC electrowetting) voltages as long as a potential between the electrodes is at a DC voltage level to form an electric field for moving the droplet. In certain embodiments, when an adjacent electrode is completely or partially turned on, the droplet disposed adjacent to it will be moved onto that turned-on electrode and wets the features disposed on the turned-on electrode. As used herein, the term "feature" refers to a region or a structure in or on which a liquid material (e.g., a drop) is deposited or formed. By moving the droplet to a next turned-on electrode using a time-varying voltage waveform provided by a control circuit, the droplet will move from electrode to electrode, thereby leaving residual tiny drops (very small or tiny drops or microdroplets) 26a in or on the features. The volume of the residual tiny drops is completely determined by the feature dimension (size) as well as the contact angle of the liquid droplet on the surface in the environment (e.g., air or oil). FIG. 3B is a top view illustrating that the droplet 26 is moving from the first electrode 34a to the second electrode 34b having nine features 35 according to an embodiment of the present disclosure. FIG. 3C is a top view illustrating that the remaining droplet 26b is moving from the second electrode to the third electrode 34c, thereby leaving residual tiny drops (microdroplets) 26a in or on the features, in accordance with an embodiment of the present disclosure. To prevent evaporation of microdroplets in the air, the droplet can be surrounded by other immiscible liquid like silicone oil. It is understood that the number of features on the electrode can be any integer number. In the example shown in FIGS. 3A to 3C, nine features are used in the second electrode. But it is understood that the number is arbitrarily chosen for describing the example embodiment and should not be limiting. It is also understood that each electrode (e.g., first, second, third electrodes) may have the same number of features, or they may have different number of features. Referring to FIGS. 3A to 3C, the features are shown to have a square shape, however, it in understood the shown shape is not limiting and any other shapes are equally suitable such as circular, rectangular, oval, elliptic, polygonal, and other shape.

It is noted that the electrodes according to embodiments of the present disclosure can be arranged in various configurations and the electrodes can have many shapes. For example, the electrodes can have a polygonal shape (e.g., square, rectangular, triangular, and the like), a circular shape, an oval shape, etc. The configuration can be a checker-board configuration, or other geometric configurations.

Figure 4A:
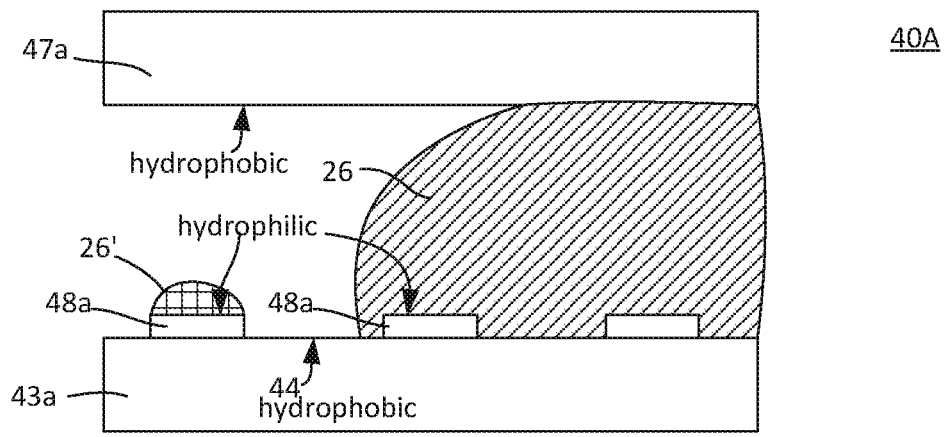
FIG. 4A is a cross-sectional view of a portion of an EWOD device according to an embodiment of the present disclosure.

The patterned features can be implemented in different ways. In one embodiment, the surface of the dielectric layer is selectively partitioned into hydrophobic regions and hydrophilic regions. Within a certain range of a surface area ratio between the hydrophobic regions and hydrophilic regions, and as well as the interfacial tension between a droplet and the environment (oil or air), the droplet can be moved away from the hydrophobic regions while leaving residual small drops (microdroplets) in the hydrophilic regions. The volume of a residual small drop (microdroplet) is defined by the dimension of a hydrophilic feature as well as the contact angle of the droplet on the surface in the environment (air or oil). FIG. 4A is a cross-sectional view of a portion of an EWOD device 40A according to an embodiment of the present disclosure. Referring to FIG. 4A, the EWOD device 40A includes a substrate structure having a first substrate (not shown) with a first dielectric layer 43a disposed thereon and a second substrate (not shown) with a second dielectric layer 47a disposed thereon. A droplet 26 is disposed between the first dielectric layer 43a having a first surface 44 and the second dielectric layer 47a having a second surface facing the first surface. In one embodiment, the first surface of the first dielectric layer includes a plurality of hydrophilic regions 48a that protrude above the surface of the first dielectric layer 43a. The surface of the first dielectric layer 43a is coated with a hydrophobic film, i.e., the protruding hydrophilic regions 48a are surrounded by an interstitial hydrophobic surface region. The protruding hydrophilic regions 48a may be arranged in a pattern such that a residual small droplet (microdroplet) of the droplet disposed on each of the hydrophilic regions has a desired volume. The protruding hydrophilic regions each may have a polygonal shape (e.g., square, rectangular), oval, circular, elliptic, and other shapes. The term "protruding hydrophilic region" may also be referred to as a "spot" or "island" in the present disclosure. In some embodiments, the second dielectric layer 47a is made of glass that is coated with a hydrophobic film. In some embodiments, the first dielectric layer and the second dielectric layer are formed separately, and a spacer such as the one shown and described in FIGS. 2A, 2C, and 2E is formed either on the first dielectric layer or on the second dielectric layer. The first and second dielectric layers are then bonded together to form the structure shown in FIG. 4A having a space therebetween operative as a channel for the droplet 26. In some embodiments, the second dielectric layer 47a is coated with an electrical conducting layer of a metal material that serves as a common electrode (e.g., ground electrode) and a hydrophobic film on the conducting layer. The protruding hydrophilic regions may be formed on the surface of the first dielectric layer 43a using conventional semiconductor manufacturing techniques. Some of these semiconductor manufacturing techniques will be described in detail in the example section further below. The EWOD 40A also includes an array of electrodes (not shown) embedded within the first dielectric layer, the second dielectric layer, or in both first and second dielectric layers that generate a moving electric field in response to time-sequentially varying voltages provided by a control circuit. The droplet 26 is moved by the moving electric field across the surface of the first dielectric layer while leaving residual small portions (microdroplets) 26' of the droplet 26 on the protruding hydrophilic regions 48a.

Figure 4B:
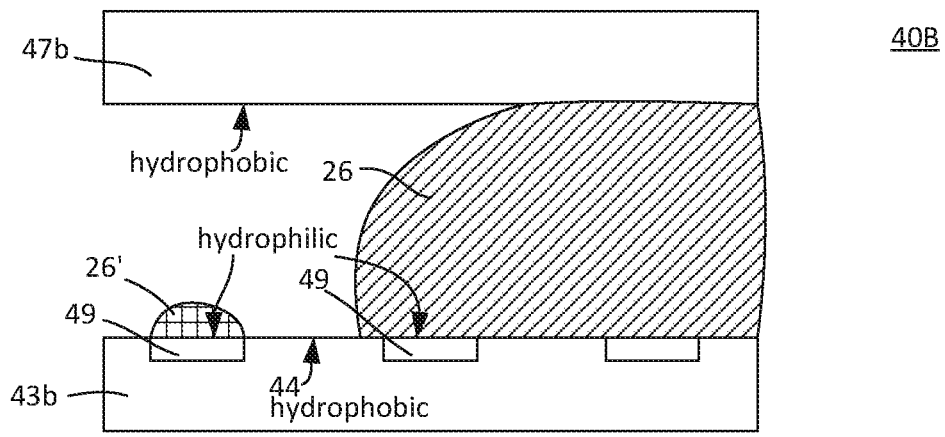
FIG. 4B is a cross-sectional view of a portion of an EWOD device according to another embodiment of the present disclosure.

FIG. 4B is a cross-sectional view of a portion of an EWOD device 40B according to another embodiment of the present disclosure. Referring to FIG. 4B, the EWOD device 40B includes a substrate structure that is similar to the substrate structure shown in FIG. 4A with the difference that the first dielectric layer 43b includes a plurality of grooves (microwells) 49 having a certain depth instead of the protruding regions. In one embodiment, the second surface of the second dielectric layer is hydrophobic, and the first dielectric layer includes a plurality of grooves (microwells) 49 having a certain depth. The terms "grooves," "recesses," and "microwells" are used interchangeably herein. Each of the grooves also have an opening determined by a length and a width. In some embodiments, the length and the width are less than 1 micron. By carefully choosing the shape of microwells or/and alter the inside surface (sidewalls and/or bottom) of the microwells from hydrophobic to hydrophilic chemically (i.e., by surface treatment) or electrically (i.e., by electrowetting), a portion of the aqueous droplet would spontaneously wet into a microwell and has tendency to stay inside the microwell even after the electrical field has been removed. Within a certain range of the area ratio between the flat hydrophobic surface of the first dielectric layer and the microwells as well as the interfacial tension between the droplet and environment (oil or air), the droplet can be moved away from the microwells while leaving (depositing) residual small droplets (microdroplets) inside the microwells. The volume of residual small droplets (microdroplets) is determined by the predetermined microwell dimension and contact angle of the droplet on the opening of the microwell. Similar to the structure described above in connection with FIG. 4A, the second dielectric layer 47b may be coated with an electrical conducting layer of a metal material that serves as a common electrode (e.g., ground electrode) and a hydrophobic film on the conducting layer. The recessed hydrophilic regions may be formed in the first dielectric layer 43b using conventional semiconductor manufacturing techniques. The EWOD 40B also includes an array of electrodes (not shown) embedded within the first dielectric layer, the second dielectric layer, or in both first and second dielectric layers that generate a moving electric field in response to time-sequentially varying voltages provided by a control circuit (not shown). The droplet 26 is moved by the moving electric field across the surface of the first dielectric layer while leaving residual small portions (microdroplets) 26' of the droplet 26 on the surface of the microwells. In some embodiments, an array of microwells can be obtained using lithographically patterning and etching processes. Some of these semiconductor manufacturing techniques will be described in detail in the example section further below.

Figure 4C:
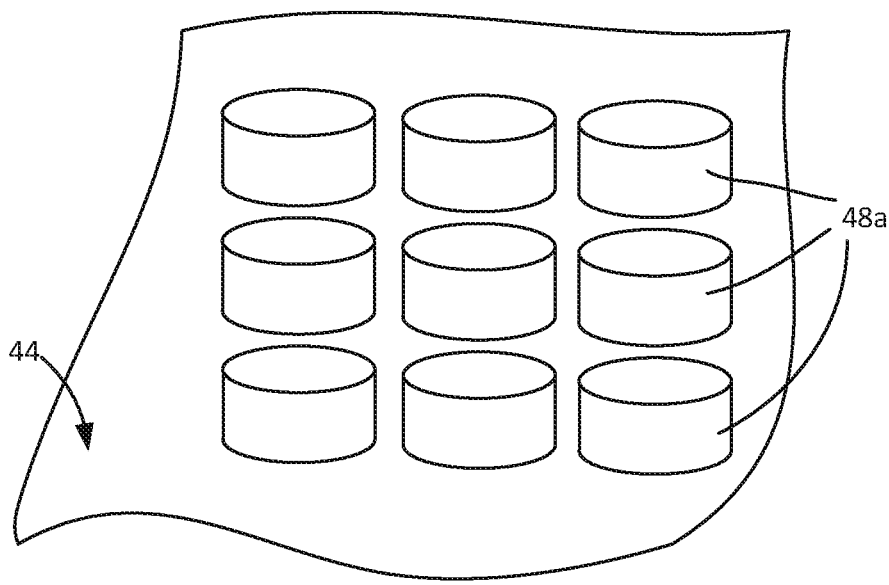
FIG. 4C is a perspective view of a portion of an EWOD device shown in FIG. 4A.

FIG. 4C is a perspective view of a portion of an EWOD device 40A shown in FIG. 4A. Referring to FIG. 4C, a set of round cylindrical spots (protruding hydrophilic regions) 48a are arranged in an array. As used herein, the terms "spots," "islands," "protruding regions" are interchangeably used. The spots 48a are spaced apart and isolated from each other by an interstitial hydrophobic surface 44. It is noted that, although the spots 48a are shown having round cylindrical shape in the example shown, those of skill in the art will appreciate that the spots 48a may also have other shapes, such as rectangular, square, or oval cylindrical shape.

Figure 4D:
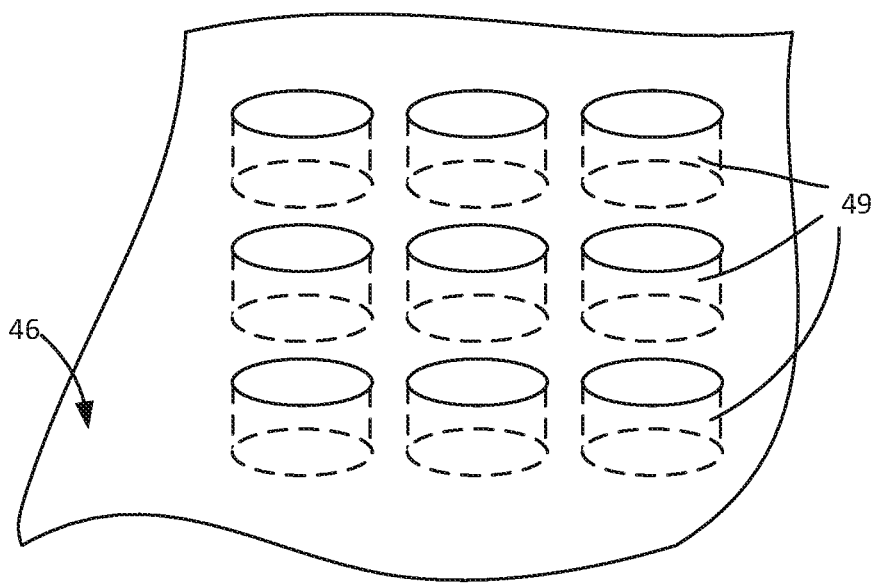
FIG. 4D is a perspective view of a portion of an EWOD device shown in FIG. 4B.

FIG. 4D is a perspective view of a portion of an EWOD device 40B shown in FIG. 4B. Referring to FIG. 4D, a set of round cylindrical grooves (microwells) 49 are arranged in an array. The microwells 49 are filled with a hydrophobic material and spaced apart from each other by an interstitial hydrophobic surface 46. In some embodiments, the hydrophobic material filling the microwells 49 has an upper surface flush with an upper surface of the interstitial hydrophobic surface 46. It is noted that, although the microwells 49 are shown as round cylindrical wells, the microwells 49 may also be rectangular, square, or oval cylindrical wells depending upon applications.

Figure 4E:
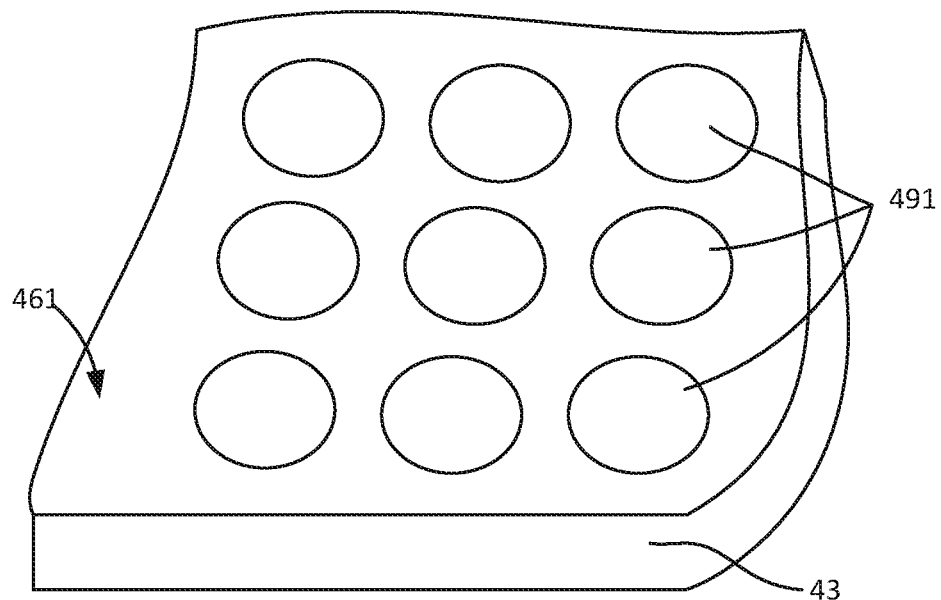
FIG. 4E is a perspective view of a portion of an EWOD device according to an embodiment of the present disclosure.

FIG. 4E is a perspective view of a portion of an EWOD device according to an embodiment of the present disclosure. Referring to FIG. 4E a set of hydrophilic surfaces 491 is surrounded (flanked) by hydrophobic interstitial regions 461 on the surface of the dielectric layer 43, i.e., the hydrophilic surfaces 491 are flush with the surface of the hydrophobic interstitial regions 461 on the surface of the dielectric layer 43.

In accordance with the present disclosure, the large number of microdroplets having a uniform size can be used to perform droplet digital PCR on a microfluidic chip. With a small volume of each sample and below certain DNA concentration meeting the Poisson distribution requirement, each sample of the droplet (microdroplet) would have either one DNA molecule or no DNA molecule. By thermo-cycling the samples (microdroplets) with a conventional PCR or incubating them under a certain temperature with an isothermal PCR, a single DNA molecule within a target region can be amplified on each sample within the environment (e.g., oil). After reading the final droplet's DNA concentration by optical detection or pH measurement through integrated on-chip ion-sensitive field-effect transistor (ISFET) sensors, we can quantify the absolute numbers of a targeted DNA in the array of samples (microdroplets) and then use the absolute DNA quantification to calculate the DNA concentration in the bulk droplet. The terms "sample," "residual small droplet," "small portions of the droplet," and "microdroplet" are used interchangeably herein and refer to a small droplet formed from a bulk droplet according to embodiments of the present disclosure.

In accordance with the present disclosure, a droplet containing multiple different DNA targets can be dispensed on a region of a single microfluidic chip, the droplet is then moved by electrowetting to a next region which produces a multitude of samples (copies of the DNA targets) from the droplet for detection or measurement of the samples. In some embodiments, the next region where the droplet is moved to may include a plurality of hydrophilic regions spaced apart by an interstitial hydrophobic surface. The plurality of hydrophilic regions may be the one shown and described in connection with FIGS. 4A and 4B. Each of the hydrophilic regions may include an ion-sensitive field-effect transistor (ISFET) sensor configured to measure a pH value of the samples disposed thereon. That is, the single microfluidic chip may include an array of ISFET sensors each being associated with one of the samples of the droplet. This arrangement of the single microfluidic chip enables the formation of a plurality of samples (microdroplets) from a droplet by electrowetting and the measurement of the samples by an array of ISFET devices that are integrated on-chip. In accordance with the present disclosure, the array of ISFET sensors embedded in the hydrophilic regions facilities a concurrent measurement of different targets from a droplet with high sensitivity and accuracy.

Figure 5:
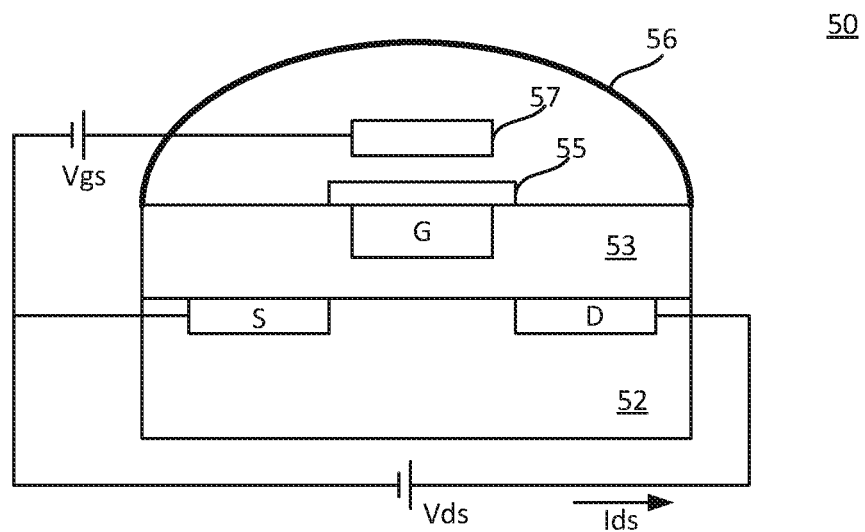
FIG. 5 is a cross-sectional view of an ISFET device according to an embodiment of the present disclosure.

FIG. 5 is a cross-sectional view of an ISFET device 50 according to an embodiment of the present disclosure. Referring to FIG. 5, the ISFET device 50 is a metal oxide semiconductor (MOS) transistor, which can be a p-channel MOS field effect transistor (MOSFET) or an n-channel MOSFET transistor that is manufactured using standard CMOS manufacturing processes. In the following description, an n-channel MOS transistor (NMOS) transistor is used according to an exemplary embodiment of the present disclosure. However, it should be noted that the selection of NMOS or PMOS is merely a choice depending upon a chosen process or substrate, and is not limiting. Referring to FIG. 5, the ISFET device 50 has a substrate 52, a source region S and a drain region D formed in the substrate, a dielectric layer 53 on the substrate, and a floating gate G formed within or on the dielectric layer 53. The ISFET device further includes a sensing membrane 55 on the floating gate G and below a microdroplet 56, and a reference electrode 57 entirely or partially immersed in the microdroplet 56 and spaced apart from the sensing membrane 55. The sensing membrane may include any material that provides sensitivity to hydrogen ion concentration (pH), such as silicon nitride, silicon oxynitride, and the like. As known to those of skill in the art, other sensing membranes may be used that are sensitive to other ions.

Still referring to FIG. 5, the ISFET device 50 also includes a voltage source Vgs configured to provide a voltage Vgs between the sample and the source region S, a voltage source Vds configured to provide a voltage Vds between the source region and the drain region. When the voltage Vgs is greater than the threshold voltage Vth of the ISFET device, the channel between the source and drain regions will conduct current. The amount of current Ids flowing between the source region and the drain region represents a concentration or a pH value of the sample 56. In one embodiment, the source region and the substrate have the same potential, e.g., ground potential.

In the example shown in FIG. 5, one ISFET device is used for measuring ion concentration of the microdroplet 56. But it is understood that the number is only chosen for describing the example embodiment and should not be limiting. In some embodiments, more than one ISFET device may be used for measuring ion concentration of the microdroplet 56. In other words, each spot or microwell can have a number of ISFET devices.

In some embodiments, each spot of the array of spots or each microwell of the array of microwells shown in respective FIGS. 4C and 4D may have more than one ISFET device to increase the measurement sensitivity and accuracy. The number of ISFET devices available for each spot or microwell depends from conventional CMOS manufacturing processes and application requirements. Power supply voltages supplied to the ISFET devices through electrical connections may be implemented using conventional CMOS manufacturing processes and will not be described herein for the sake of brevity.

Figure 1B:
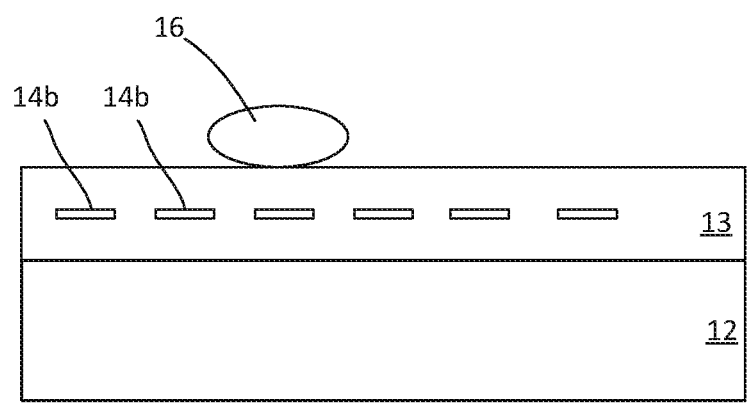
FIG. 1B is a simplified cross-sectional view of the EWOD device shown in FIG. 1A taken along the line B-B'.
Figure 6A:
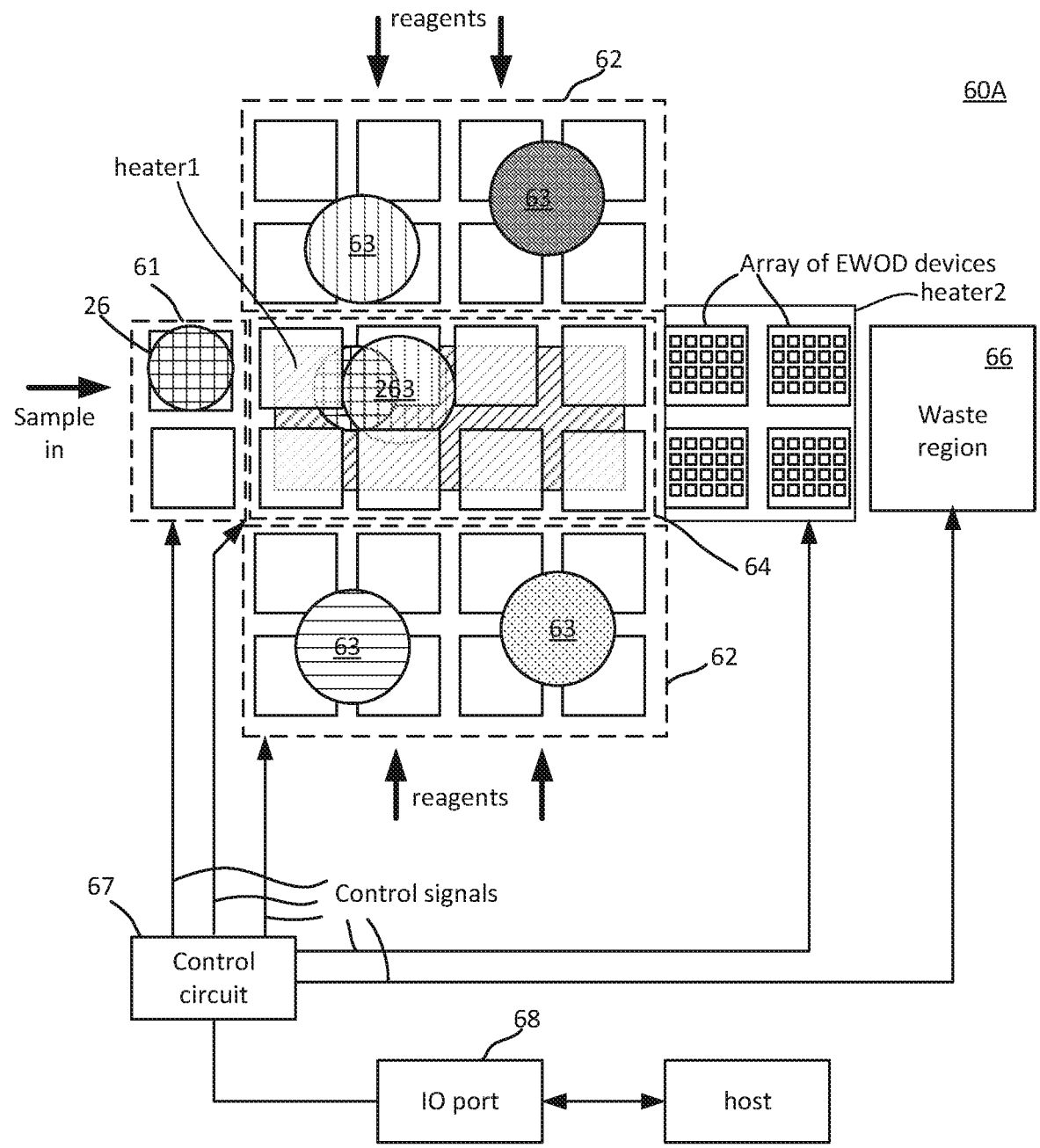
FIG. 6A is a simplified top view of an integrated lab-on-a-chip device according to an embodiment of the present disclosure.

FIG. 6A is a simplified top view of an integrated lab-on-a-chip device 60A according to an embodiment of the present disclosure. Referring to FIG. 6A, the integrated lab-on-a-chip device 60A includes a substrate structure having a droplet receiving region 61 configured to receive one or more droplets 26, a reagent receiving region 62 configured to receive one or more reagents 63, a mixing region 64 configured to mix the droplet 26 with the one or more reagents 63 to obtain a mixed droplet 263, and an array of EWOD devices configured to partition a droplet (mixed or not mixed) into a plurality of microdroplets and amplify the microdroplets. In one embodiment, the array of EWOD devices may feature first heating elements configured to heat the microdroplets to a first temperature for amplification of the microdroplets and second heating elements for annealing the amplified microdroplets. In one embodiment, the lab-on-a-chip device 60 may further include an array of sensors each being associated with a sample and configured to measure a concentration or a pH value of the microdroplets. In one embodiment, the droplet receiving region 61 may have the device structure shown in FIGS. 1A and 1B. In one embodiment, the reagent receiving region 62 may have the device structure shown in FIGS. 1A and 1B. In other words, the integrated lab-on-a-chip device 60 may be operable to move the one or more droplets and the one or more reagents toward the mixing region 64 and control the mixing of the droplets with the reagents according to a user provided software program. In one embodiment, the array of EWOD devices may include a plurality of EWOD devices arranged in a regular pattern, each of the EWOD devices may have the structure similar or the same as the device structure shown in FIGS. 2A to 2C. In some embodiments, each of the EWOD devices may include a plurality of ISFETs. An example of an ISFET device is shown in FIG. 5. The integrated lab-on-a-chip device 60A may further include a waste (collection) region 66 for collecting the residual portion of the droplet after the microdroplets have been formed in the array of EWOD devices and/or the microdroplets after they have been processed and measured. In the example shown in FIG. 6A, two electrodes are used in the droplet receiving regions 61, eight electrodes are used in the upper portion of the reagent receiving region 62, eight electrodes are used in the lower portion of the reagent receiving region 62, eight electrodes are used in the mixing region 64, and an array of four EWOD devices are used. But it is understood that these number are arbitrary chosen for describing the example embodiment and should not be limiting.

In some embodiments, the integrated lab-on-a-chip device 60A may also include a control circuit 67 configured to provide control signals to the droplet receiving region 61, the reagent receiving region 62, the mixing region 64, the array of EWOD devices, and the waste region 66 for moving the droplet 61, the reagents 63, the mixed droplet 263, the partitioned droplet (i.e., microdroplets) and the residual portion of droplet after passing through the array of EWOD devices. In one embodiment, the integrated lab-on-a-chip device 60A may include an input/output (IO) port 68 configured to interface with a host. In one embodiment, the host may be a separate or external processor configured to provide control signals to the integrated lab-on-a-chip device 60. In another embodiment, the host may be integrated with the integrated lab-on-a-chip device 60 in a same package. One of ordinary skill in the art would recognize many variations, modifications, and alternatives. Referring still to FIG. 6A, the control circuit 67 may be disposed remotely from the integrated lab-on-a-chip device 60A and communicates with the integrated lab-on-a-chip device 60A via an input-output port or a serial interface port. In one embodiment, the integrated lab-on-a-chip device 60A may also include a first heating block "heater 1" formed within the substrate structure below the surface of the mixing regions 64 for maintaining and/or varying an incubation temperature for the mixed droplet 263. In one embodiment, the integrated lab-on-a-chip device 60A may further include a second heating block "heater 1" formed within the substrate structure below the surface of the array of EWOD devices for maintaining and/or varying an incubation temperature for the microdroplets. The first and second heating blocks are formed of metal or polysilicon wires, metal or polysilicon layer(s), polysilicon layer(s) that can convert an electric energy of signals received from the control circuit 67 into a thermal energy.

Figure 6B:
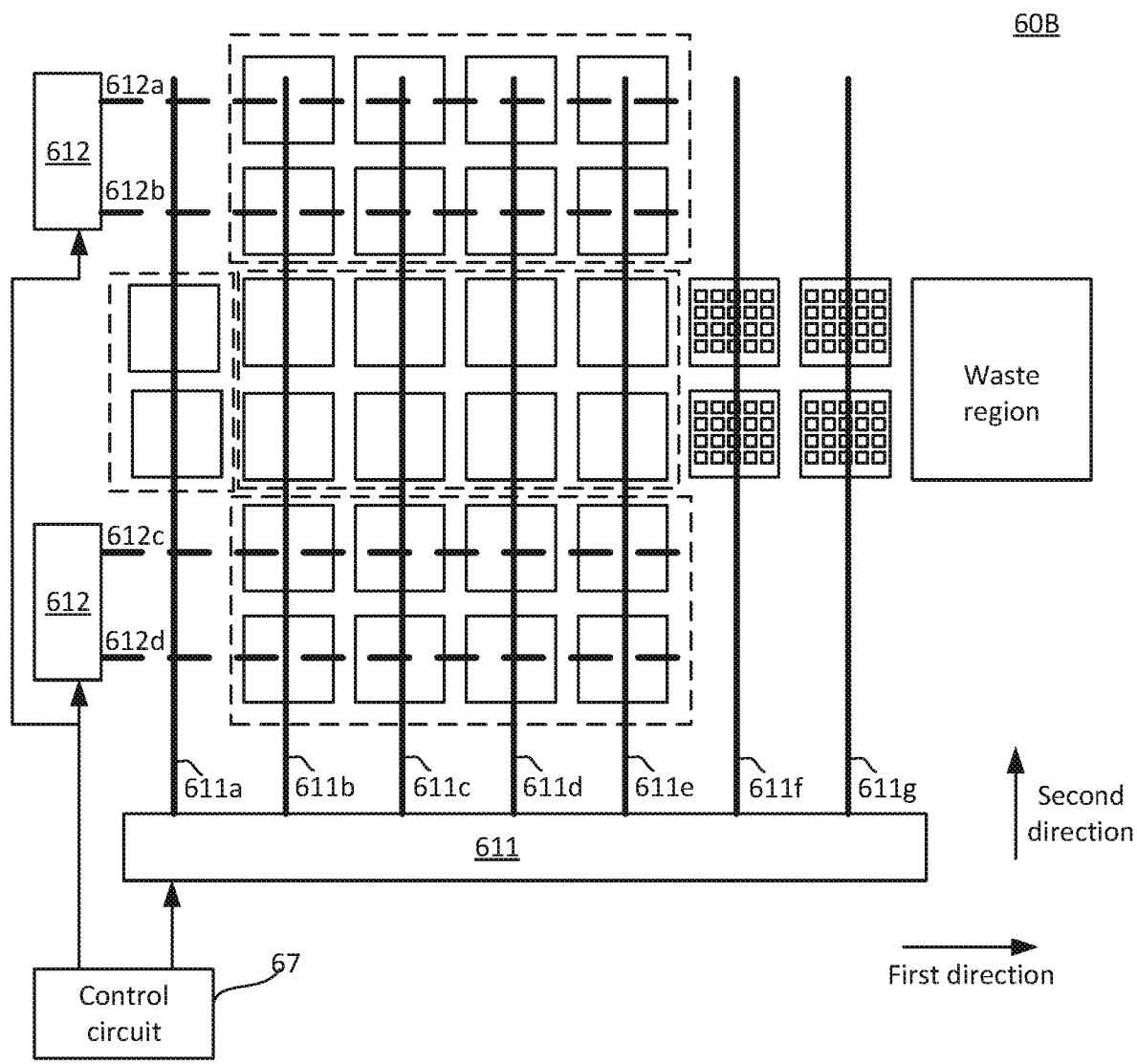
FIG. 6B is a simplified top view of an example arrangement of electrodes of the integrated lab-on-a-chip device in FIG. 6A according to an embodiment of the present disclosure

FIG. 6B is a simplified top view of an example arrangement of electrodes 60B of the integrated lab-on-a-chip device 60A according to an embodiment of the present disclosure. Referring to FIG. 6B, the electrodes 60B of the integrated lab-on-a-chip device of FIG. 6A includes a first array of electrically conductive stripes 611 having, e.g., stripes 611a, 611b, 611c, 611d, 611e, 611f, and 611g arranged in parallel to each other along a first direction from the first region (the droplet receiving region) toward the third region (the array of EWOD devices). The first array of stripes 611 is controlled by a control circuit 67 and configured to generate moving electric fields to transport the droplet along the first direction. The electrodes 60B also includes a second array of parallel stripes 612 having, e.g., stripes 612a, 612b, 612c, 612d, arranged in parallel to each other along a second direction perpendicular to the first direction. The second array of stripes 612 is configured to generate moving electric fields to transport the droplet along the second direction toward the second region (the mixing region). The first array of stripes intersect the second array of stripes and are spaced apart from the second array of stripes by an insulating layer, i.e., the first and second arrays of stipes are arranged in different layers separated by at least one insulating layer. In the example shown in FIG. 6B, the second array of stripes 612 are arranged in the reagent receiving region for transporting the reagents toward the mixing region. But it is understood that the second array of stripes 612 can also be arranged in the droplet receiving region, in the mixing regions, and in the array of EWOD devices to generate moving electric fields and electric forces to move the droplet, the mixed droplet, and the microdroplets along the second direction. In some other embodiments, the electrodes 60B may include an array of electrodes similar to the one shown and described in connection with FIGS. 1A and 1B. One of ordinary skill in the art would recognize many variations, modifications, and alternatives.

Figure 7:
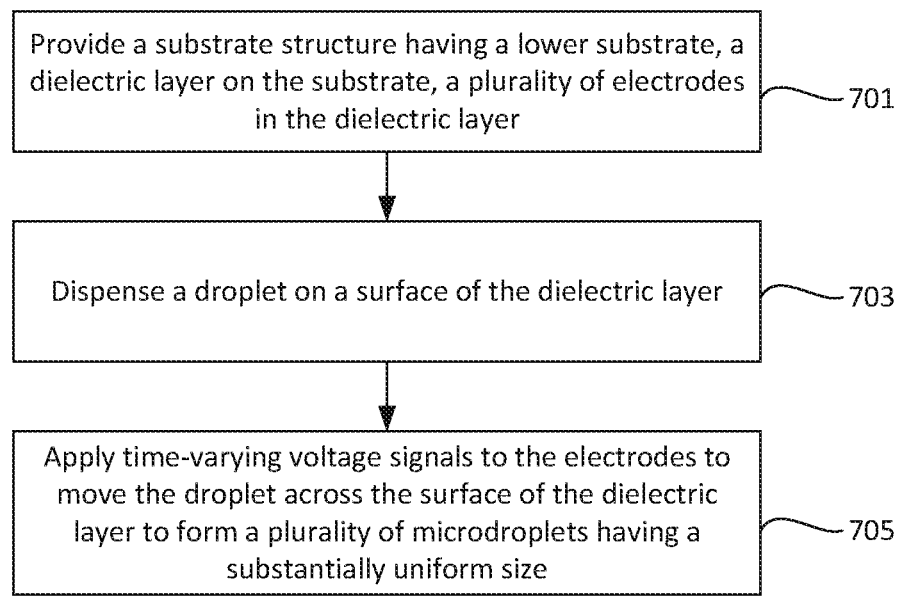
FIG. 7 is a simplified flowchart illustrating a method for forming a plurality of samples from a droplet according to an embodiment of the present disclosure.

FIG. 7 is a simplified flowchart illustrating a method 70 for forming a plurality of microdroplets from a droplet according to an embodiment of the present disclosure.

Referring to FIG. 7, the method 70 may include, at 701, providing a substrate structure having a lower substrate, a dielectric layer on the lower substrate, a plurality of electrodes in the dielectric layer. In one embodiment, the dielectric layer has a hydrophobic surface and a plurality of protruding hydrophilic surface regions (spots) having substantially the same size spaced apart by the hydrophobic surface. In another embodiment, the dielectric layer has a hydrophobic surface and a plurality of microwells (small grooves) having substantially the same size in the dielectric layer. Each of the microwells has a hydrophilic bottom and hydrophilic sidewalls (collectively referred to as a hydrophilic surface region). At 703, the method may include dispensing a droplet on a surface region of the dielectric layer. At 705, the method may include applying time-varying control voltage signals by a control circuit (e.g., host) to the electrodes to move the droplet across the hydrophobic surface of the dielectric layer while leaving small residual portions on the hydrophilic surface regions to form a plurality of microdroplets thereon, the microdroplets have substantially the same size.

Figure 8:
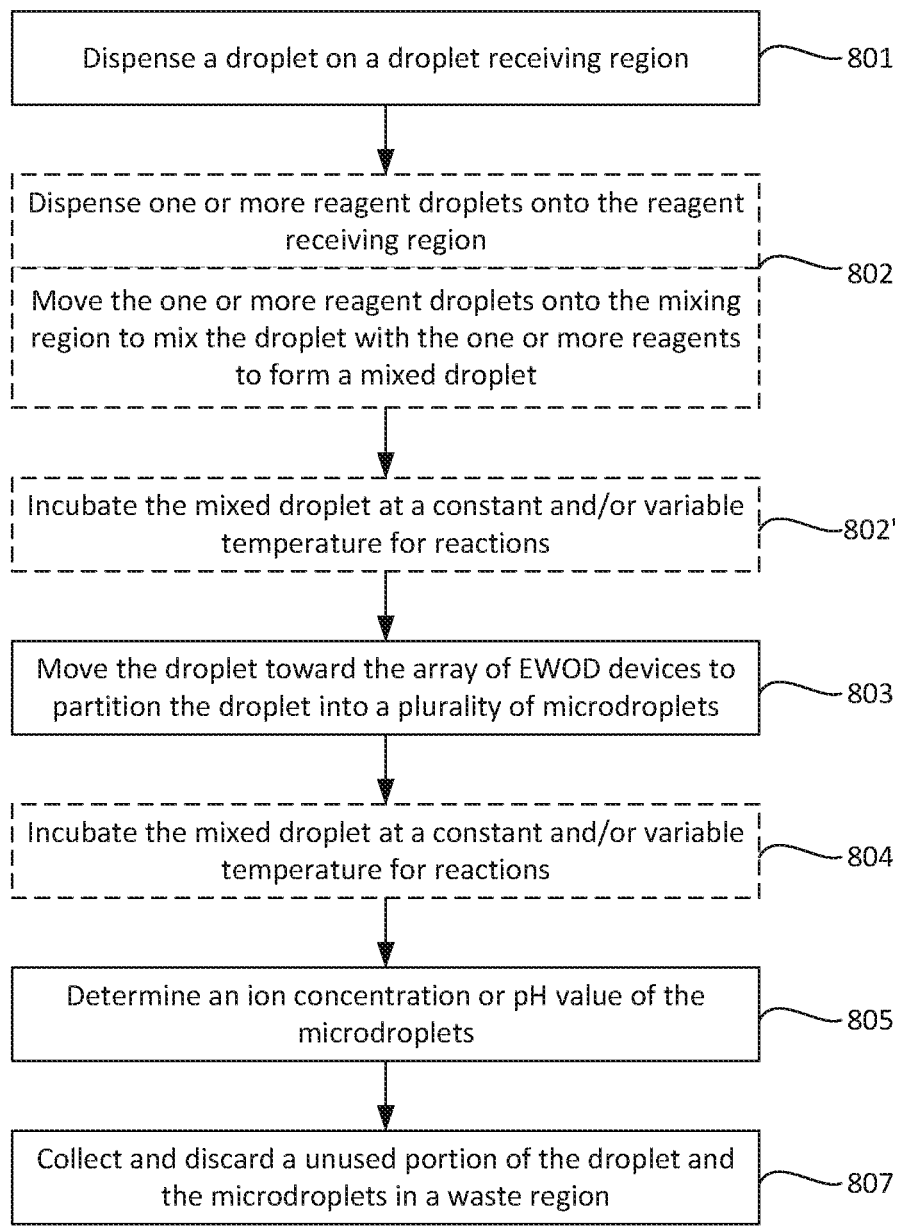
FIG. 8 is a simplified flowchart illustrating a method for operating an integrated lab-on-a-chip apparatus according to an embodiment of the present disclosure.

FIG. 8 is a simplified flowchart illustrating a method 80 for operating an integrated lab-on-a-chip apparatus according to an embodiment of the present disclosure. In some embodiments, the integrated lab-on-a-chip apparatus may be the same or similar to the integrated lab-on-a-chip device 60 shown in FIG. 6. That is, the integrated lab-on-a-chip apparatus includes a droplet receiving region configured to receive a droplet, a reagent receiving region configured to receive one or more reagents, a mixing region configured to mix a droplet with one or more reagents, and an array of EWOD devices configured to partition a received droplet (a droplet of the droplet receiving region that may be mixed with one or more reagents or a droplet that is not mixed with any reagent) into a plurality of microdroplets, the mixed droplet incubates with a constant or/and variable temperature controlled by heaters underneath the surface of the mixing region 64, and the microdroplets further incubate at a constant or/and variable incubation temperature by heaters underneath the surface of the EWOD devices. In one embodiment, the lab-on-a-chip apparatus may further include an array of sensors associated with the microdroplets and configured to measure an ion concentration or a pH value of the microdroplets. Referring to FIG. 8, the method 80 may include, at 801, dispensing a droplet on a surface of the droplet receiving region. At 803, the method may include moving the droplet toward an EWOD device of the array of EWOD devices across the mixing region, where the droplet is partitioned into a plurality of microdroplets whose pH value before or/and after incubation may be determined by an ISFET sensor formed on the EWOD device. At 807, the method may collect and discard any unused (residual) portion of the droplet and the microdroplets in a waste region of the integrated lab-on-a-chip apparatus. In one embodiment, the method may also include, at 802, dispensing one or more reagent droplets onto a surface of the reagent receiving region. At 802, the method may further include moving the one or more reagent droplets toward the mixing region for mixing the reagent droplets with the droplet under a user-defined software program prior to moving the droplet to the EWOD devices for partitioning the droplet into multiple microdroplets. In one embodiment, the method may further include, at 802', incubating the mixed droplets for reactions at a constant or variable temperature. In one embodiment, the method may also include, at 804, incubating the microdroplets in the EWOD array at an incubation temperature. In one embodiment, the incubation temperature in the EWOD array region is maintained at a constant incubation temperature. In one embodiment, the incubation temperature in the EWOD array region may be variable. In some embodiments, after discarding the residual portion of the droplet and the microdroplets that have been measured, the method may repeat at step 801.

Figure 9:
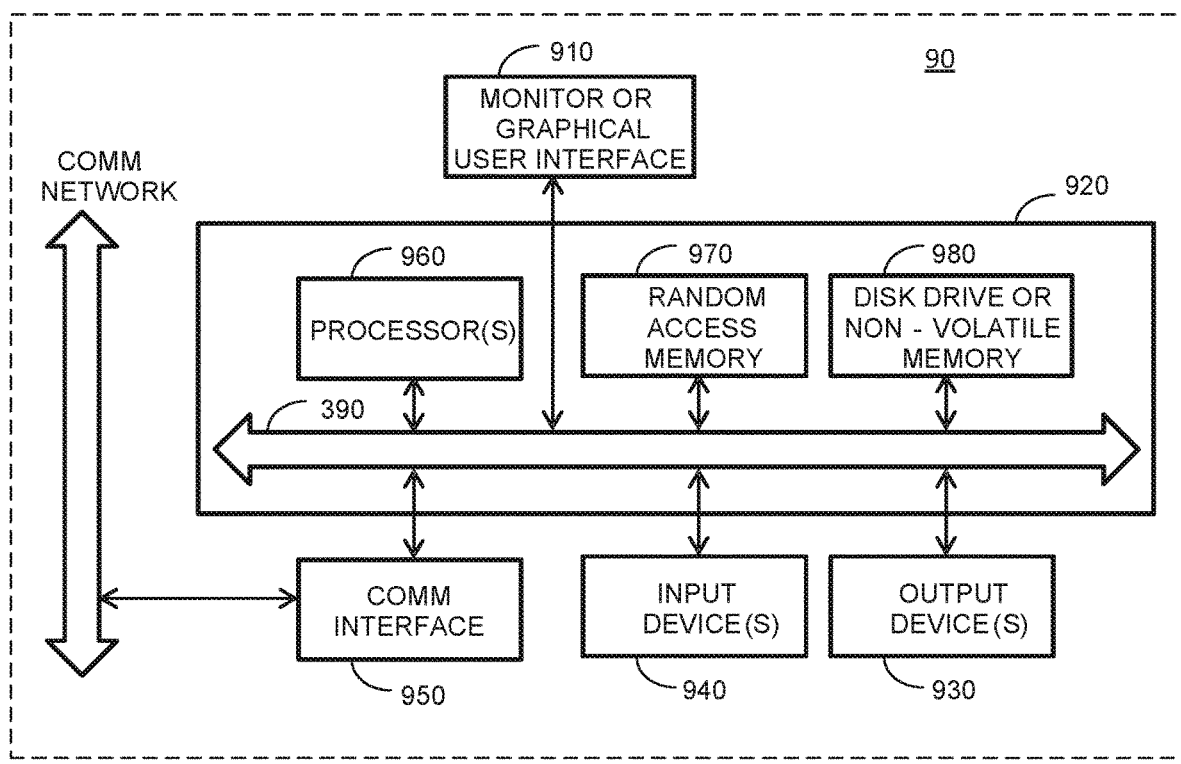
FIG. 9 is a simplified schematic diagram of a computer system that can be used to control the EWOD device and the lab-on-a-chip device according to an embodiment of the present disclosure.
Figure 9:
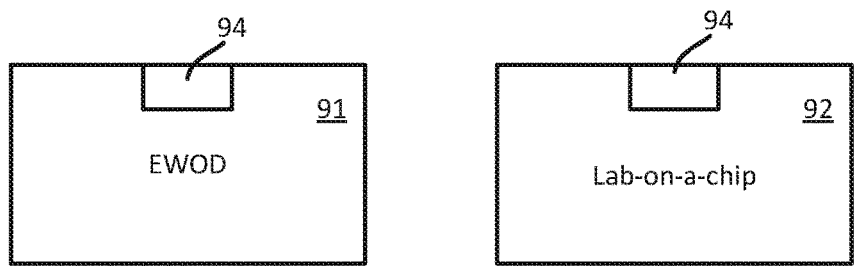

FIG. 9 is a simplified schematic diagram of a mobile computing device 90 that can be used to control the EWOD device and the lab-on-a-chip device according to an embodiment of the present disclosure. Referring to FIG. 9, the mobile computing device 90 may include a monitor 910, computing electronics 920, user output devices 930, user input devices 940, a communications interface 950, and the like.

The computing electronics 920 may include one or more processors 960 that communicates with a number of peripheral devices via a bus subsystem 990. These peripheral devices may include user output devices 930, user input devices 940, a communications interface 950, and a storage subsystem, such as random access memory (RAM) 970 and a disk drive 980.

The user input devices 930 may include all any types of devices and interfaces for inputting information to the computer device 920, e.g., a keyboard, a keypad, a touch screen, a mouse, a trackball, a track pad, a joystick and other types of input devices.

The user output devices 940 may include any types of devices for outputting information from the computing electronics 920, e.g., a display (e.g., monitor 910).

The communications interface 950 provides an interface to other communication networks and devices. The communications interface 950 may serve as an interface for receiving data from and transmitting data to other systems. For example, the communications interface 950 may include a USB interface for communicating with an EWOD device or a lab-on-a chip device.

The RAM 970 and the disk drive 980 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. The RAM 970 and the disk drive 980 may be configured to store the basic programming and data constructs that provide the functionality of the present invention.

Software code modules and instructions that provide the functionality of the present disclosure may be stored in the RAM 970 and the disk drive 980. These software modules may be executed by the processors 960.

Referring still to FIG. 9, an EWOD device 91 and a lab-on-a-chip device 92 each may include an interface port 94 configured to provide communications with the mobile computing device 90. In some embodiments, the mobile computing device 90 may provide instructions and control signals via the interface port 94 to control the signal levels of the electrodes in the EWOD device 91 and the lab-on-a-chip device 92. In some embodiments, the EWOD device 91 may include a substrate structure as described in one of the FIGS. 2A-2C, 3A-3C, 4A-4E, and one or more of ISFET devices of FIG. 5. The EWOD device 91 is designed to accept a droplet and provide a pH value associated with the droplet. In some embodiments, the EWOD device 91 may be part of the lab-on-a chip device 92.

EXAMPLES

The following examples are offered to illustrate, but not to limit the claimed invention.

Example 1

This example discloses the preparation of the patterned features on a surface of a dielectric layer. FIG. 4A shows a cross-sectional view of a dielectric layer 43*a*. The dielectric layer 43*a* may be deposited on a substrate (e.g., substrate 22 shown in FIG. 2A) by a conventional deposition (e.g., chemical vapor deposition) process. The dielectric layer may include silicon oxide, silicon nitride, fluorinated silicate glass (FSG), or organo-silicate glass (OSG). In one embodiment, the dielectric layer is coated with a hydrophobic material. The hydrophobic material may be coated using a spin-spray process where the hydrophobic material is sprayed onto the surface of the dielectric layer. In another embodiment, the surface of the dielectric layer is exposed to a hydrophobic solution at a certain temperature and for a certain time duration. In yet another embodiment, the hydrophobic material may be formed on the dielectric layer by a deposition (e.g., chemical vapor deposition) process. The hydrophobic material may include organic or inorganic materials such as octadecyltrichlorosilane, perfluorodecyltrichlorosilane, other fluorinated layers such as tetrafluoroethylene, and the like. Thereafter, a patterned photoresist layer is formed on the dielectric layer (which is coated with a hydrophobic material) to exposed a surface portion of the dielectric layer. The dielectric layer is then subjected to a wet hydrophilicity increasing surface treatment such as a spin-spray process where a hydrophilicity increasing solution is sprayed onto the surface of the dielectric layer using the patterned photoresist layer as a mask. In another embodiment, the exposed surface of the dielectric layer is in contact with a hydrophilicity increasing solution at a certain temperature and for a certain time duration. The hydrophilicity increasing solution includes a surfactant or wetting agent including one of cationic surfactants, anionic surfactants, and nonionic surfactants. Thereafter, the patterned photoresist layer is removed to obtain the hydrophilic regions 48a on the surface of the dielectric layer, as shown in FIG. 4A or FIG. 4C.

In another embodiment, after forming a patterned photoresist layer on the dielectric layer, an etch process (wet etching, dry etching, or a combination of wet and dry etching) is performed on the dielectric layer using the patterned photoresist as a mask to form a plurality of recessed grooves in the dielectric layer. Thereafter, a hydrophilicity increasing solution is then deposited filling the grooves. The patterned photoresist layer is then removed by a chemical mechanical polishing (CMP) process to obtain the structure as shown in FIG. 4B or FIG. 4D.

Example 2

This example discloses the formation of the electrodes within the dielectric layer. In one embodiment, a first dielectric layer is formed on a substrate. A patterned photoresist layer is then formed on the dielectric layer. A metal layer or a doped polysilicon layer is then deposited on the first dielectric layer using the patterned photoresist layer as a mask. The patterned photoresist layer is then removed. Thereafter, a second dielectric layer is formed on the metal layer to form the structure as shown in FIG. 2A to FIG. 2C.

In another embodiment, a first dielectric layer is formed on a substrate. A metal layer is then deposited on the first dielectric layer. Thereafter, a patterned photoresist layer is formed on the metal layer. An etch process is then performed on the metal layer using the patterned photoresist layer as a mask. The patterned photoresist layer is then removed. Thereafter, a second dielectric layer is formed on the metal layer to form the structure as shown in FIGS. 2A to 2C.

Example 3

This example discloses a novel apparatus and method of generating a large array of extremely small drops (microdroplets) having a predetermined volume in the range between nanoliter ($10^{-9}$ liter or nL) and picoliter ($10^{-12}$ liter or pL) from a droplet by electrowetting. The novel apparatus may be the one similar or the same as the EWOD device shown in FIG. 4A or FIG. 4B. The transport mechanism of a dispensed droplet is shown with reference to FIGS. 3A through 3C. The droplet is moved over a surface of a dielectric layer having an array of raised hydrophilic regions (spots) or over a surface of a dielectric layer having an array of microwells each having a hydrophilic bottom and sidewalls. The raised (protruded) hydrophilic regions (spots) and/or the microwells are spaced apart from each other by an interstitial hydrophobic surface. In one embodiment, the raised hydrophilic regions and/or the microwells have a circular or oval shape. In another embodiment, the raised hydrophilic regions and/or the microwells have a polygonal (rectangular, square, hexagonal) shape. In one embodiment, the raised hydrophilic regions (spots) and/or the microwells have a height in the range between 1 nanometer and 100 microns, preferably between 1 micron and 10 microns, and more preferably below 10 nanometers. In one embodiment, the raised hydrophilic regions and/or the microwells have a square shape with a width or length in the range between 1 nanometer and 100 microns, preferably between 1 micron and 10 microns, and more preferably below 10 nanometers. In one embodiment, the raised hydrophilic regions and/or the microwells have a circular shape with a diameter in the range between 1 nanometer and 100 microns, preferably between 1 micron and 10 microns, and more preferably below 10 nanometers.

Example 4

Figure 10:
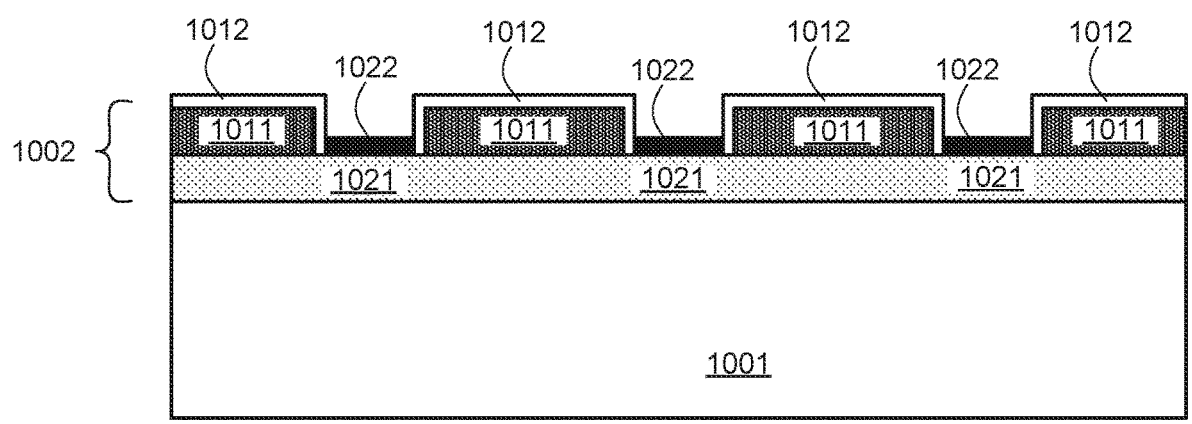
FIG. 10 is a cross sectional view of device structure having differential surface regions according to some embodiments of the present disclosure.

This example discloses the formation of a device structure having hydrophobic/hydrophilic interstitial surfaces with dimensions (sizes) from micrometers to nanometer. Example embodiments are shown in FIGS. 4A and 4C. FIG. 10 is a cross sectional view of device structure 1000 having differential surface regions according to some embodiments of the present disclosure. The device structure 1000 includes a substrate 1001. A surface layer 1002 including a plurality of first thin film regions 1011 and a plurality of second thin film regions 1021 are disposed on the substrate 1001. The substrate 1001 includes MOS circuitry (e.g., control circuit 15) and electrodes (e.g., electrodes 14) that are actuated or controlled by the control circuitry 15 as shown in FIG. 1A.

A first covering layer 1012 is formed on the top surfaces of the first thin film regions 1011, and a second covering layer 1022 is formed on the top surfaces of the second thin film regions 1021. In some embodiments, a differential surface layer is formed by alternating regions of first covering layer 1012 and regions of second covering layer 1022.

According to some embodiments, methods are provided for selecting the first material and the second material to adjust the hydrophobicity of the first covering layer and the second covering layer to form a differential hydrophobic/hydrophilic surface.

In some embodiments, the differential hydrophobic/hydrophilic surface can have alternating nonpolar molecular regions that repels water and polar molecular regions which can form ionic or hydrogen bond with water molecular. In some embodiments, a method includes first forming alternating regions of inorganic $SiO_2$ and metal oxide material including one or more of various metal oxides, such anodized aluminum ($Al_2O_3$), tantalum oxide ($Ta_2O_5$), niobium oxide ($Nb_2O_5$), zirconium oxide ($ZrO_2$), and titanium oxide ($TiO_2$), etc. These alternating regions can be formed using standard semiconductor thin film deposition and photolithography process on silicon (Si) or glass substrate, as described further below.

Next, the metal oxide surface can be treated to modify the surface property. One method is to selectively coat the metal oxide surface using polyvinylphosphonic acid (PVPA), which is a type of hydrophilic polymer inside the native pH of the phosphonic acid (pH=2), at a temperature in the temperature range of 80° C. to 100° C. In a specific embodiment, the treatment can be carried at, for example, 90° C. In some cases, the treatment can be relatively fast, for example, in less than 2 minutes (min). This step can be followed by a dry annealing step intended to support formation of covalent bonds. A dry anneal process can be carried at a suitable temperature, e.g., at 80° C. for about 10 min. This reaction can be selective, i.e., no reaction will take place on the $SiO_2$ surface.

Another method is to selectively coat the metal oxide regions by self-assembled monolayers (SAMs) based on the adsorption of the alkyl phosphate ammonium salts from aqueous solution. SAM formation does not occur on $SiO_2$ surfaces under the same conditions. The coated surface hydrophobicity can be adjusted by the formulation in the aqueous SAM forming solution, and the contact angle of water can range from 50 to 110 degrees. In some cases, the contact angle of water can range from 20 to 130 degrees. Covalent bonds can be formed during the annealing, and unreacted materials rinsed by DI water.

After the PVPA or phosphate treatment, the substrate can be dried and treated with a hydrophobic silane such as Fluorinated Alkyl-Silanes, dialkyl-Silanes etc. Alternatively, the substrate can be dried and treated with a hydrophilic silane such as Hydroxyakyl-terminated silanes in solution or chemical vapor deposition. These treatments can form stable covalent bonds with the $SiO_2$ surface and change the surface to be hydrophobic or hydrophilic without affecting metal oxide surface's hydrophobicity.

With the highly selective surface treatment of inorganic $SiO_2$ and metal oxide surfaces with different organic chemicals of different hydrophobicity, the differential hydrophobic/hydrophilic surface can be made with well-defined pattern by the semiconductor processes.

FIGS. 11A-11F are cross-sectional views illustrating a method for forming a device structure of FIG. 10 having differential surface regions according to some embodiments of the present disclosure. The method for forming a device structure having differential surfaces includes providing a substrate, and forming a surface layer having alternating first thin film regions and second thin film regions on the substrate. The surface layer is exposed to a first material to form a first covering layer on the first thin film regions, but not on the second thin film regions. The surface layer is then exposed to a second material to form a second covering layer on the second thin film regions, but not on the first thin film regions which are now covered by the first covering layer. The method includes selecting the first material and the second material to adjust the hydrophobicity of the first covering layer and the second covering layer.

Figure 11A:
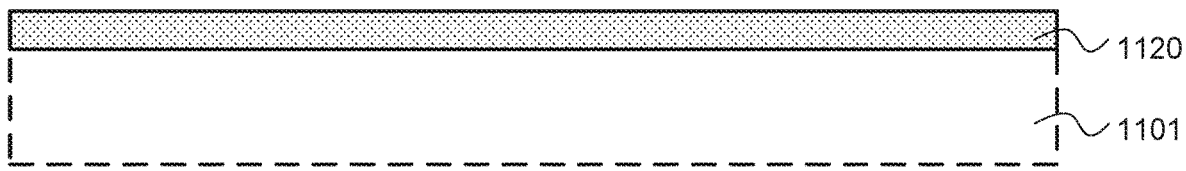
FIGS. 11A-11F are cross-sectional views illustrating a method for forming a device structure of FIG. 10 having differential surface regions according to some embodiments of the present disclosure.

FIG. 11A shows a thin film layer formed on a substrate. Referring to FIG. 11A, a thin film layer 1120 is formed on a substrate 1101. Substrate 1101 may be made of any suitable material, for example, a glass or a semiconductor. A semiconductor substrate can include various semiconductor materials, such as silicon, III-V group on silicon, graphene-on-silicon, silicon-on-insulator, combinations thereof, and the like. The substrate 1101 can be a bare wafer. The substrate 1101 can also include various devices and circuit structures. For example, the substrate 1101 can include a CMOS circuitry layer (substrate 12 including, e.g., the control circuit and other electronic switches), and a dielectric layer (e.g., dielectric layer 13 including the electrode layer 14).

Referring to FIG. 11A, the thin film layer 1120 is formed on the substrate 1101. In an embodiment, the thin film layer 1120 contains inorganic silicon oxide, e.g., $SiO_2$. In some embodiments, the thin film layer 1120 can include silicon, silicon nitride, metal oxides, etc., or combinations thereof.

The thin film layer 1120 can also include other materials that can be silanized. The thin film layer 1120 can be formed on substrate 1101 using any conventional semiconductor thin film deposition techniques.

Figure 11B:
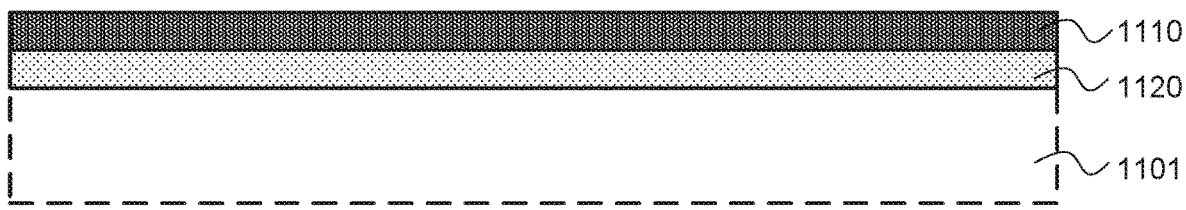

FIG. 11B shows a second thin film layer 1110 formed on a first thin film layer 1120. In some embodiments, the second thin film layer 1110 can include metal oxides or metals. Suitable metal oxides can include, for example, anodized aluminum ($Al_2O_3$), tantalum oxide ($Ta_2O_5$), niobium oxide ($Nb_2O_5$), zirconium oxide ($ZrO_2$), and titanium oxide ($TIO_2$), etc. The thin film layer 1110 can also include metal materials, such as tungsten, titanium, titanium nitride, silver, tantalum, tantalum oxide, hafnium, chromium, platinum, tungsten, aluminum, gold, copper, combinations or alloys thereof, and the like. The thin film layer 1110 can also be formed using conventional semiconductor thin film deposition techniques.

Figure 11C:
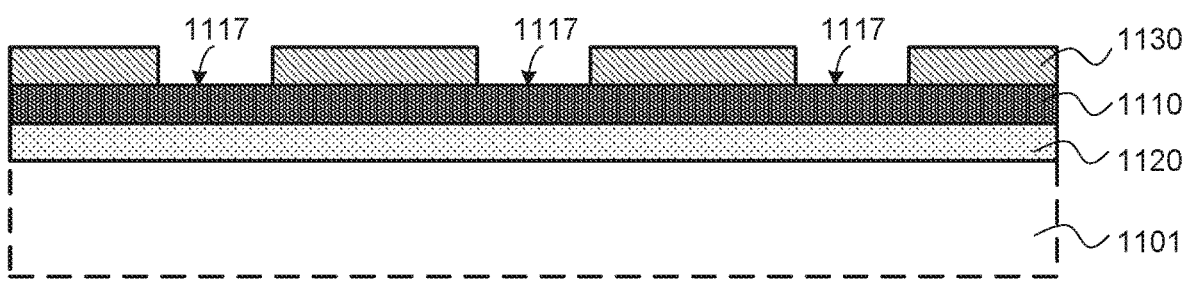

FIG. 11C shows a patterned mask layer 1130 formed on the thin film layer 1110. The mask layer 1130 includes openings exposing regions of the thin film layer 1110. The mask layer 1130 may be applied according to any suitable method, such as spin coating, dipping, and/or the like. The mask layer 1130 may also be of any suitable material, such as a photoresist. As shown in FIG. 11C, the mask layer 1130 is patterned with the openings according to conventional semiconductor lithography techniques. In some embodiments, the mask layer 1130 can be a hard mask, which is a patterned layer of suitable thin film material having suitable etch selectivity to serve as an etching mask.

Figure 11D:
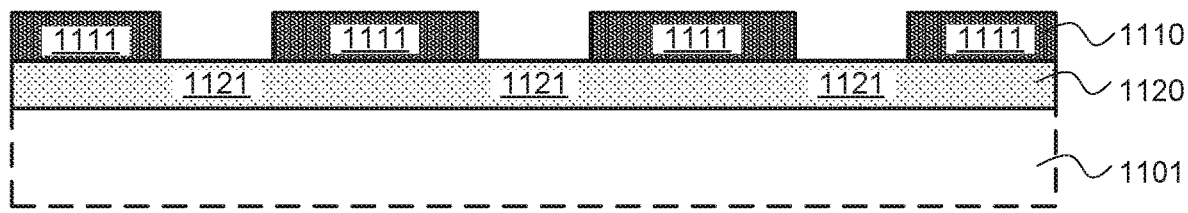

After the patterned mask layer 1130 is formed, an etch process can be carried out to remove the exposed portions 1117 in the thin film layer 1110 to obtain thin film regions 1111. The etch process can be performed according to conventional semiconductor process techniques. Subsequently, the patterned mask layer 1130 can be removed by conventional semiconductor process techniques. The resulting device structure is illustrated in FIG. 11D.

Figure 11E:
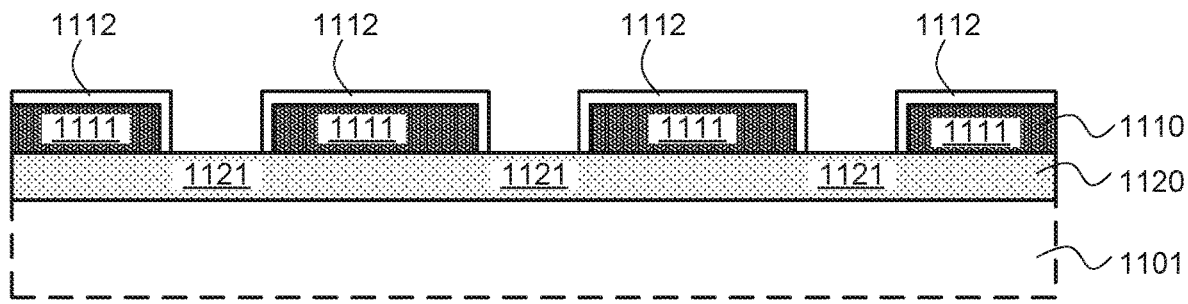

FIG. 11E shows a covering layer 1112 selectively formed on the thin film regions 1111. The selective covering layer formation is carried out by exposing the device structure to a suitable first material, such that covering layer 1112 is formed on the top surfaces of the thin film regions 1111, but not on the top surfaces of the thin film regions 1121. Depending on the materials for thin film regions 1111 and 1121, various materials can be used, as described in detail below. After the treatment of the material, an annealing process can be performed to selectively form a covering layer 1112 on the thin film regions 1111. The annealing process can be carried out at a temperature in a range of 70°–90° C. for 5-15 minutes. As an example, a dry anneal process can be carried out at a temperature of 80° C. for 10 minutes. The unreacted material can be removed by a rinse process in DI (deionized) water.

Figure 11F:
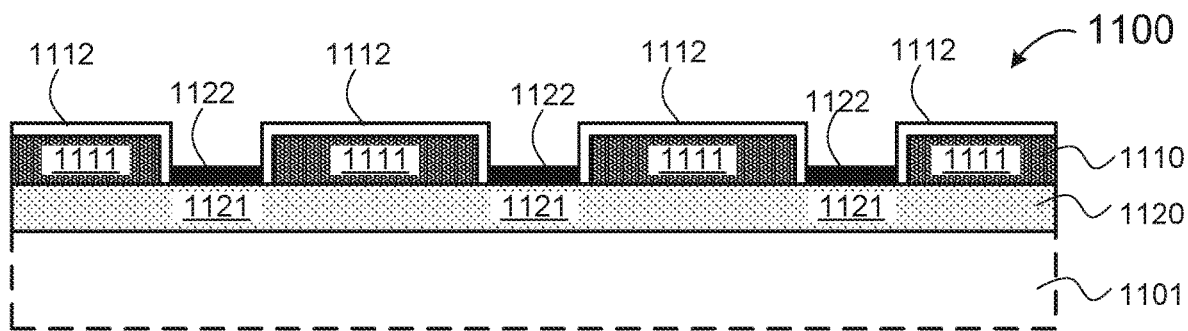

FIG. 11F shows a second covering layer 1122 selectively formed on the top surfaces of the second thin film regions 1121. The selective covering layer is formed by exposing the device structure to a suitable second material, such that covering layer 1122 is formed on the top surfaces of the thin film regions 1121, but not on the top surfaces of thin film regions 1111 with the covering layer 1112. Depending on the materials for thin film regions 1111 and 1121, various materials can be used, as described in detail below. After the process with the second material, FIG. 11F shows a cross-sectional view of a device structure 1100, similar to the device structure 1000 of FIG. 10, having a surface layer 1102 with differential surface regions 1112 and 1122 according to some embodiments of the invention. As shown, the device structure 1100 includes a substrate 1101. The surface layer 1102 including a plurality of the first thin film regions 1111 and a plurality of second thin film regions 1121 are disposed on substrate 1101.

A first covering layer 1112 is formed on the top surfaces of the first thin film regions 1111, and second covering layer 1122 is formed on the top surfaces of the second thin film regions 1121. In this embodiment, a differential surface layer is formed by alternating regions of the first covering layer 1112 and regions of second covering layer 1122.

In some embodiments, the differential surface regions can include alternating hydrophilic surfaces and hydrophobic surfaces. In some embodiments, the differential surface regions can include alternating surfaces of positive charges and surfaces of negative charges. In the description below, thin film regions 1111 are referred to as the first thin film regions, and thin film regions 1121 are referred to as the second thin film regions. The covering layers 1112 are referred to as the first covering layers, which are formed by reaction between the first thin film regions with a first material. The covering layers 1122 are referred to as the second covering layers, which are formed by reaction between the second thin film regions with a second material.

In some embodiments, the first thin film regions can include thin films of metal oxides or metals, as described above. Then the metal oxides or metals can receive a treatment and be exposed to phosphonic acids, such as PVPA (Polyvinylphosphonic acid). In some embodiments, the treatment can be carried out at a temperature ranging from 80° C. to 100° C. for 1-3 minutes. For example, the treatment can be carried out at 90° C. for 2 minutes. This treatment can form a hydrophilic covering layer.

In some embodiments, the metal oxides or metals can be exposed to phosphates in a SAM (self-assembled monolayer) process. For example, a SAM process using ammonium salt of hydroxy dodecyl phosphate, $OH\text{-}DDPO_4(NH4)_2$, can form a hydrophobic covering layer with a contact angle of about 110 degrees. In another example, a SAM process using 12-Hydroxy dodecyl phosphate, ($OH\text{-}DDPO_4$), can form a hydrophiliic covering layer with a contact angle of about 50 degrees. In still other examples, a SAM process using a mixture of the different phosphate compounds can form a covering layer with different hydrophobicity, with contact angles ranging from 50 to 110 degrees. Further, with suitable combination of different phosphates, a covering layer with different hydrophobicity can be formed, with contact angles that can ranges from, for example, 20 to 130 degrees.

After the first covering layers formed on the metal oxides or metals thin films, a second covering layer can be formed selectively on the regions of the second thin film regions of, e.g., inorganic silicon oxide. For example, a hydrophobic covering layer can be formed by treating the device in a hydrophobic silane, such as fluorinated Alkyl-Silanes, dialkyl-Silanes, etc. Alternatively, a hydrophilic covering layer can be formed by treating the device in a hydrophilic silane, such as such as Hydroxyakyl terminated silanes, etc. With appropriate selection of the silane compounds, the second covering layer can be formed only on the second thin film regions of, e.g., inorganic silicon oxide, and not on the first covering layer already formed on the first thin film materials. Besides inorganic silicon oxide, the second thin film regions can also include materials such as silicon, silicon nitride, metals oxides, or combinations thereof.

In the process described above, the alternating first thin film regions 1110 and second thin film layer 1120 are formed in a sequence such that the first thin film regions 1110 are formed on the second thin film regions 1120. In some other embodiments, the second thin film regions 1120 can be formed on the first thin film regions 1110, as illustrated below with reference to FIGS. 12A-12C.

Figure 12A:
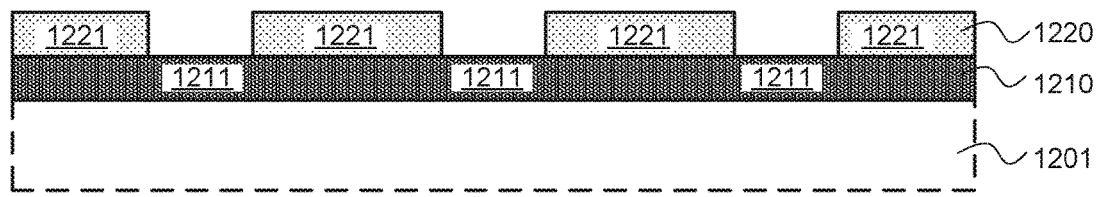
FIGS. 12A-12C are cross-sectional views illustrating a method for forming a device structure of FIG. 10 having differential surface regions according to alternative embodiments of the present disclosure.
Figure 12B:
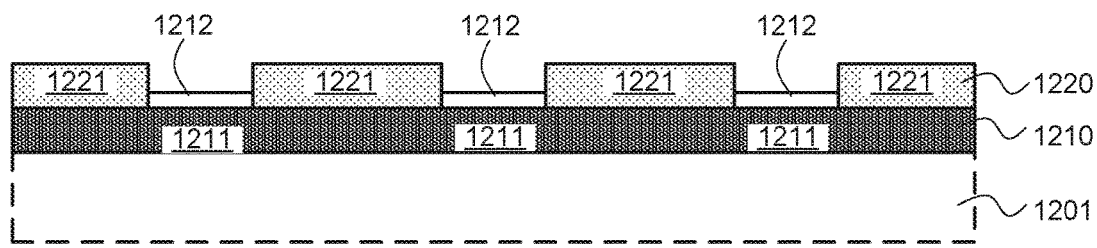
Figure 12C:
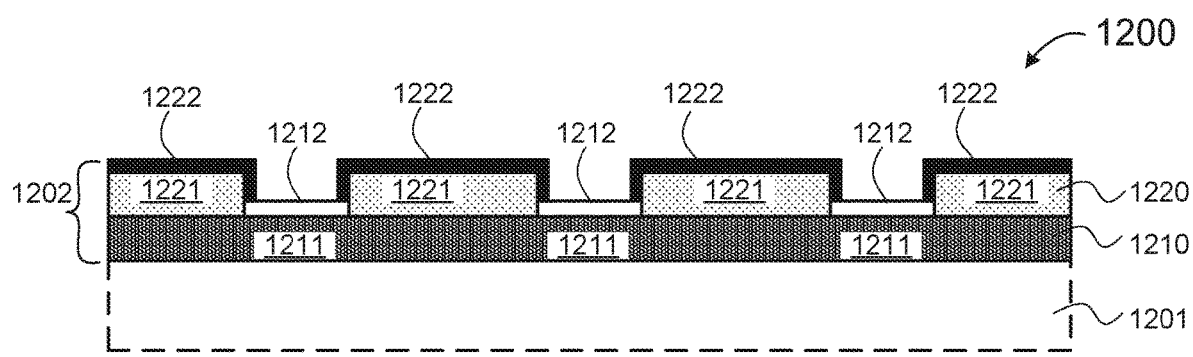

FIGS. 12A-12C are cross-sectional views illustrating a method for forming a device structure of FIG. 10 having differential surface regions according to alternative embodiments of the present disclosure.

FIG. 12A shows a cross-sectional view of a device structure having alternating surface regions of thin film layer 1210 and thin film layer 1220. Referring to FIG. 12A, a surface layer including a plurality of first thin film regions 1211 and a plurality of second thin film regions 1221 are formed on substrate 1201.

The device structure in FIG. 12A is similar to that in FIG. 11D, with the first thin film layer 1210 corresponding to the first thin film layer 1110 in FIG. 11D, and the second thin film layer 1220 corresponding to the second thin film layer 1120 in FIG. 11D. One difference between the structures in FIGS. 11D and 12A is that the first thin film layer 1210 is below the second thin film layer 1220. The device structure in FIG. 12A can be formed using a similar process as described in FIGS. 11A-11C, with the sequence of thin film layer formation reverse.

FIG. 12B shows a covering layer 1212 selectively formed on the thin film regions 1211. The selective covering layer formation is by exposing the device structure to a suitable first material, such that the covering layer 1212 is formed on the top surfaces of the thin film regions 1210, but not on the top surfaces of the thin film regions 1220. The treatment process and annealing process are similar to those described in connection with FIG. 11E, with the covering layer 1212 corresponding to the covering layer 1112 in FIG. 11E.

FIG. 12C shows a second covering layer 1222 selectively formed on the top surfaces of the second thin film regions 1221. The selective covering layer formation is by exposing the device structure to a suitable second material, such that covering layer 1222 is formed on the top surfaces of the thin film regions 1221, but not on the top surfaces of thin film region 1211 with the covering layer 1212. The treatment process is similar to that described in connection with FIG. 11F. After the process with the second material, FIG. 28C shows a cross-sectional view of a device structure 2800, having a surface layer 2802 with differential surface regions 2812 and 2822. As shown in FIG. 12C, the device structure 1200 includes a substrate 1201. The surface layer 1202 including a plurality of first thin film regions 1211 and a plurality of second thin film regions 1221 are disposed on substrate 1201.

A first covering layer 1212 is formed on the top surfaces of the first thin film regions 1211, and a second covering layer 1222 is formed on the top surfaces of the second thin film regions 1221. In this embodiment, a differential surface layer is formed by alternating regions of first covering layer 1212 and regions of second covering layer 1222.

In alternative embodiments, the processes illustrated in FIGS. 11A-11F and FIGS. 12A-12C can also be modified. For example, the sequence of surface layer formation can be reversed with proper selection of thin film materials and the compounds for surface treatment. In some embodiments, in FIGS. 11D-11F, the covering layer 1122 can be formed on the thin film regions 1121 in the structure of FIG. 11D first, and then the covering layer 1112 can be formed on the thin film regions 1111. Similarly, in FIGS. 12A-12C, the covering layer 1222 can be formed on the thin film regions 1221 in the structure of FIG. 12A first, and then the covering layer 1212 can be formed on the thin film regions 1211.

Although the processes described herein are described with respect to a certain number of steps being performed in a certain order, it is contemplated that additional steps may be included that are not explicitly shown and/or described. Further, it is contemplated that fewer steps than those shown and described may be included without departing from the scope of the described embodiments (i.e., one or some of the described steps may be optional). In addition, it is contemplated that the steps described herein may be performed in a different order than that described.

For example, the first and second thin film regions can be either metal or metal oxide, or silicon oxide. Even though in the above example, a covering layer formed by phosphonic acid or phosphate on metal oxides is formed first, followed by a covering layer formed by silane on silicon oxide. In some embodiments, a first covering layer can be formed first by silane on silicon oxide, and then a second covering layer can be formed by phosphonic acid or phosphate on metal oxides. In some embodiments, the treatment by phosphonic acid or phosphate on metal oxides is followed by an annealing process as described above.

Example 5

This example discloses a novel apparatus and method of mixing a droplet with one or more reagents and transporting the mixed droplet to an array of EWOD to obtain a plurality of extremely small drops (microdroplets). In one embodiment, the extremely small drops (microdroplets) generated by the novel apparatus and method have a uniform size. The novel apparatus may be an integrated lab-on-a-chip device similar or the same as shown in FIG. 6. In some embodiments, the novel apparatus may include different regions such as a droplet discharge region for receiving a droplet, a reagent discharge region for receiving a reagent, a mixing region for mixing the droplet with the reagent, and an array of IWOD devices for generating a plurality of samples having a uniform size. In one embodiment, the apparatus may also include temperature-regulating elements for performing a conventional PCR or incubate the microdroplets under a predetermined temperature (isothermal PCR). In one embodiment, the IWOD regions each may feature an array of raised (protruding) hydrophilic surface regions or spots (as shown in FIGS. 4A and 4C) or an array of recessed hydrophilic surface regions or microwells (as shown in FIGS. 4B and 4D). In some embodiments, each of the spots or microwells include one or more ISFET for measuring an ion concentration or a pH value of an associated microdroplet. In one embodiment, the apparatus may include an interface port configured to communicate with an external host that collects the measured pH values of the samples and calculate a DNA concentration of the droplet.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

For all flowcharts herein, it will be understood that many of the steps can be combined, performed in parallel or performed in a different sequence without affecting the functions achieved.

What is claimed is:

1. An apparatus for forming a plurality of microdroplets from a droplet, the apparatus comprising:
    a first substrate having a first surface;
    a dielectric layer on the first surface of the first substrate and having a plurality of electrodes in the dielectric layer, wherein a plurality of two-dimensional arrays of microdroplet forming hydrophilic surface regions each are located directly above each of plurality of electrode and spaced apart from each other by one or more hydrophobic surfaces;
    the plurality of electrodes in the dielectric layer forming an electric field across the droplet in response to voltages provided by a control circuit to move the droplet across one of the plurality of two-dimensional arrays of microdroplet forming hydrophilic surface regions of the dielectric layer in a lateral direction while leaving portions of the droplet on the microdroplet forming hydrophilic surface regions to form the plurality of microdroplets on the microdroplet forming hydrophilic surface regions; and
    wherein each of the plurality of microdroplets is disposed above an upper surface of the dielectric layer and protrudes into a channel.

2. The apparatus of claim 1, wherein each of the plurality of two-dimensional arrays of microdroplet forming hydrophilic surface regions is an array of uniformly sized structures.

3. The apparatus of claim 2, wherein the structures each are protruding over an upper surface of the dielectric layer.

4. The apparatus of claim 2, wherein the structures each are grooves below an upper surface of the dielectric layer.

5. The apparatus of claim 4, wherein the grooves each contain a hydrophilic material having an upper surface flush with the upper surface of the dielectric layer.

6. The apparatus of claim 1, further comprising a plurality of sensors, each being associated with one of the plurality of microdroplets, wherein each sensor comprises:
    an ion sensitive field effect transistor including an ion sensing film configured to be exposed to a solution containing in a microdroplet and provide a signal associated with a concentration level of the solution of the microdroplet; and
    a reference electrode configured to provide a reference voltage to the solution.

7. The apparatus of claim 1, further comprising a second substrate having a second surface facing the first surface of the first substrate and spaced apart from the first substrate by a spacer having a height, wherein the height of the spacer determines a the channel.

8. The apparatus of claim 7, further comprising a common electrode on the second surface of the second substrate, wherein the common electrode has a common voltage lower than the voltages applied to one or more electrodes of the plurality of electrodes.

9. The apparatus of claim 1, the apparatus further comprising:
- a first region for receiving the droplet;
- a second region for receiving one or more reagents, the second region being in communication with the first region and configured to mix the droplet with the one or more reagents; and
- a third region in communication with the second region and comprising the microdroplet forming hydrophilic surface regions spaced apart from each other by the one or more hydrophobic surfaces, wherein a portion of the droplet forms the plurality of microdroplets on the microdroplet forming hydrophilic surface regions when the droplet moves over the microdroplet forming hydrophilic surface regions.

10. The apparatus of claim 9, further comprising a fourth region in communication with the third region and configured to collect a remaining portion of the droplet after the remaining portion of the droplet has moved across the third region.

11. The apparatus of claim 2, wherein the uniformly sized structures have a polygonal, circular, or oval cylindrical shape.

12. The apparatus of claim 6 wherein the reference electrode is configured to be entirely or partially immersed in a microdroplet of the plurality of microdroplets and spaced apart from the sensing film.

13. The apparatus of claim 8 wherein the voltages applied to the one or more electrodes of the plurality of electrodes are a direct current (DC) voltage.

* * * * *